United States Patent [19]

Hanaoka et al.

[11] Patent Number: 5,612,993

[45] Date of Patent: Mar. 18, 1997

[54] FACSIMILE COMMUNICATION SYSTEM

[75] Inventors: Hideyuki Hanaoka; Kenji Ishihara, both of Tokyo; Kazuo Harima, Yokohama, all of Japan

[73] Assignee: Matsushita Graphic Communication Systems, Inc., Japan

[21] Appl. No.: 265,034

[22] Filed: Jun. 24, 1994

[30] Foreign Application Priority Data

Jun. 24, 1993 [JP] Japan ................................. 5-153235
Dec. 7, 1993 [JP] Japan ................................. 5-306424

[51] Int. Cl.⁶ ........................... H04M 11/00; H04M 1/00
[52] U.S. Cl. ........................... 379/100; 379/354; 379/355; 379/96
[58] Field of Search ................. 379/100, 96, 97, 379/98, 354, 355, 356, 201; 358/400, 468, 440, 443, 434

[56] References Cited

U.S. PATENT DOCUMENTS

| | | | |
|---|---|---|---|
| 4,754,335 | 6/1988 | Izawa et al. ............................ | 379/100 |
| 4,847,694 | 7/1989 | Nishihara ............................... | 358/434 |
| 5,146,348 | 9/1992 | Kaneyama .............................. | 379/100 |
| 5,182,766 | 1/1993 | Garland .................................. | 379/355 |
| 5,394,462 | 2/1995 | Maemura ................................ | 379/355 |
| 5,465,295 | 11/1995 | Furman .................................. | 379/100 |

*Primary Examiner*—Jason Chan
*Attorney, Agent, or Firm*—Rossi & Associates

[57] ABSTRACT

In a facsimile communication system, a user's terminal facsimile apparatus stores a plurality of character strings each composed of instruction words and data to be sent to a host apparatus for identifying one of communication services offered from the host apparatus. Accordingly, when one of the stored character strings is selected and executed, the corresponding communication service is offered from the host apparatus to the user's terminal facsimile apparatus. The character string may be produced by actually communicating with the host apparatus so that a transmission timing of the data in the character string can be precisely matched with what is required by the host apparatus.

16 Claims, 23 Drawing Sheets

| | ABBREVIATED NUMBER | TITLE OF SERVICE | DATA LENGTH | DIALLING CONTENT |
|---|---|---|---|---|
| TEL DIRECTORY AREA | 00 | REQUESTING TRIAL EXAM RESULT | 29 | I000334911100W10T1234000W10X |
| | 01 | SENDING TRIAL EXAM ANSWER | 27 | I100334911100ET1201010W10Y |
| | 03 | REQUESTING TRIAL EXAM GUIDANCE | 23 | 0334911100ET2121M04W10Y |
| | 04 | AREA A | 13 | 0339700211M05 |
| | 05 | AREA B | 10 | 0356780123 |
| | . . . | . . . | . . . | . . . |
| | NN | | | |

FIG. 2

| INN | COMMAND FOR DISPLAYING IMAGE "NN", INPUTTING DATA ACCORDING TO DISPLAYED IMAGE, AND STORING INPUTTED DATA, WHEN CONFIRMED, AT ADDRESS "NN" OF INPUTTED DATA STORING AREA OF RAM 6 |
|---|---|
| ONN | COMMAND FOR SENDING DATA STORED AT ADDRESS "NN" OF INPUTTED DATA STORING AREA |
| T | COMMAND FOR SETTING TO PB SIGNAL MODE TEMPORALLY |
| WNN | COMMAND FOR WAITING FOR TIME PERIOD SPECIFIED BY "NN" |
| X | COMMAND FOR SETTING TO FAX RECEIVING MODE |
| Y | COMMAND FOR SETTING TO FAX TRANSMITTING MODE |
| E | COMMAND FOR WAITING UNTIL DETECTION OF POLARITY REVERSE |
| MNN | COMMAND FOR DIALLING TEL NUMBER IDENTIFIED BY ABBREVIATED NUMBER "NN" |
| SN | COMMAND FOR SETTING FINISH STAMP OFF WHEN N=0, AND ON WHEN N=1 |
| MDN | COMMAND FOR SETTING READING RESOLUTION NORMAL WHEN N=0, FINE WHEN N=1, AND SUPERFINE WHEN N=2 |
| ⋮ | ⋮ |

REQUESTING TRIAL EXAM RESULT

PLEASE INPUT EXAMINEE'S NUMBER

☐ ☐ ☐ ☐ ☐ ☐ ☐ ☐

| CORRECT | CONFIRM | | | |
|---|---|---|---|---|
| F1 | F2 | F3 | F4 | F5 |

FIG. 4

TEL DIRECTORY AREA

| ABBREVIATED NUMBER | TITLE OF SERVICE | DATA LENGTH | DIALLING CONTENT |
|---|---|---|---|
| 00 | REQUESTING TRIAL EXAM RESULT | 29 | I0003349111OOW10T1234000W10X |
| 01 | SENDING TRIAL EXAM ANSWER | 27 | I10033491100ET1201010W10Y |
| 03 | REQUESTING TRIAL EXAM GUIDANCE | 23 | 03349111OOET2121M04W10Y |
| 04 | AREA A | 13 | 0339700211M05 |
| 05 | AREA B | 10 | 0356780123 |
| ... | ... | ... | ... |
| NN | | | |

FIG. 5

| IMAGE DISPLAY INFORMATION AREA | 00 | IMAGE DISPLAY INFORMATION |
| | | REQUIRED INPUT DIGIT NUMBER INFORMATION |
| | | AVAILABLE INPUT KEY INFORMATION |
| | | INPUTTED DATA STORING AREA |
| | 01 | IMAGE DISPLAY INFORMATION |
| | | REQUIRED INPUT DIGIT NUMBER INFORMATION |
| | | AVAILABLE INPUT KEY INFORMATION |
| | | INPUTTED DATA STORING AREA |
| | | |
| | NN | |

FIG. 18(A)

INFORMATION RETRIEVAL MENU

"APPARATUS MENU"
1   FAX INFORMATION SERVICE
2   FAX INFORMATION SERVICE
         (NEW RECORDING)
3   APPARATUS SETTING

PLEASE PUSH A DESIRED NUMBER.

FIG. 18(B)

SERVICE SELECTION MENU

"FAX INFORMATION SERVICE"
1   TODAY'S WEATHER
2   RESORT INFORMATION (REGION A)
3   RESORT INFORMATION (REGION B)
4   RESORT INFORMATION (REGION C)
5   RESORT INFORMATION (REGION D)
6   SHOPPING GUIDANCE

PLEASE PUSH A DESIRED NUMBER.

FIG. 18(C)

"FAX INFORMATION SERVICE"

TODAY'S WEATHER

 W
1087654321W5X

INFORMATION SERVICE BEING OFFERED

FIG. 19(A)

```
      "FAX INFORMATION SERVICE"

"NEWLY RECORDED"

1234567ETW321
```

FIG. 19(B)

```
      "FAX INFORMATION SERVICE"

"NEWLY RECORDED"

1234567ETW32121W
            1087654321W5X

INFORMATION RECEIVING

RECORD
       INFORMATION          1 YES
       NAME ?               2 NO
```

FIG. 19(C)

```
      "FAX INFORMATION SERVICE"

"NEWLY RECORDED"

1234567ETW32121W
            1087654321W5X

RETRIEVAL   : 32
       NUMBER

RETRIEVAL   : TODAY'S WEATHER
       NUMBER
```

FIG. 22(A)

```
"FAX INFOREMATION SERVICE"

TODAY'S WEATHER

1234567ETW32121W
       1087654321  W5X

ERROR OCCURRED        1 YES
CONNECT AGAIN ?       2 NO
```

FIG. 22(B)

```
"FAX INFOREMATION SERVICE"

TODAY'S WEATHER

1234567ETW32121W
    1587654321W5X
```

FACSIMILE COMMUNICATION SYSTEM

BACKGROUND OF THE INVENTION

1. Field of the Invention

The present invention relates to a facsimile communication system, wherein an information offerer stores information or data in a store-and-forward switching apparatus (hereinafter referred to as "the host") for exclusive use in a facsimile communication service while an information user picks up desired information from among the stored information using a terminal facsimile apparatus.

2. Description Prior Art

Recently, the facsimile communication services have been widely available. In the facsimile communication services, the information offerers store a great amount of information to be offered in the store-and-forward switching apparatuses or hosts, respectively, which are for exclusive use in the facsimile communication services, and the users can freely pick up the desired information from among the stored information by operating their terminal facsimile apparatuses, respectively.

Hereinbelow, an operation of a conventional user's terminal facsimile apparatus in the facsimile communication service will be described with reference to FIGS. 24 and 25.

In an operation A, the user first makes a call to the host. In case the user takes advantage of the information to be offered by this host on a frequent basis, the user may record a telephone number of this host in the user's facsimile apparatus for the abbreviated dialing so as to make a call using the abbreviated dialing.

When a telephone line is closed, an audio guidance 1 is sent from the host. The audio guidance 1 is, for example, "Please send a service number of a service to be utilized." In response to this audio guidance 1, when the user wants a service of "requesting trial examination result" to be offered, the user dials a service number "1234" representative of the service of "requesting trial examination result" in an operation B.

After sending the service number, an audio guidance 2 is sent from the host. The audio guidance 2 is, for example, "Please send an examinee's number." In response to this audio guidance 2, the user dials a desired examinee's number, for example, "12345678" in an operation C.

After sending the examinee's number, an audio guidance 3 is sent from the host. The audio guidance 3 is, for example, "Please push a facsimile start button." In response to this audio guidance 3, the user pushes the facsimile start button in an operation D. Accordingly, a CED signal which is a called terminal identification signal is sent to the host from the user's facsimile apparatus.

Subsequently, a facsimile communication is started between the host and the user's facsimile apparatus as in the known manner so that the required information on the trial examination result for the designated examinee's number is sent from the host to the user's facsimile apparatus as image or picture data.

According to the foregoing conventional structure, it is fully convenient for a beginner to take advantage of the facsimile communication service since the terminal facsimile apparatus can be operated according to the audio guidances from the host. On the other hand, it is burdensome for a user experienced even in some degree to follow the audio guidances one by one since such an experienced user knows what to do next and further since the same series of the operations is required every time the user requires the information. Specifically, when the user requires the information of the same kind on a frequent or sequential basis, it is burdensome to repeat the same series of the operations every time the user requires such information. For example, in the foregoing example of the operations, although only the operation C should change among the operations A to D so as to obtain the information of, such as, the trial examination results for the respective examinee's numbers sequentially, the user should repeat the series of the operations A to D every time the user requires such information.

This raises a serious problem particularly when a frequency of utilizing the facsimile communication service is high, for example, to a degree that the telephone number of the host is recorded for the abbreviated dialing.

SUMMARY OF THE INVENTION

Therefore, it is an object of the present invention to provide an improved facsimile communication system.

According to one aspect of the present invention, a facsimile communication system comprises operation means including a plurality of keys; storing means for storing a telephone number of a given station and a command for designating one of services offered from the given station, the storing means storing the telephone number and the command in a storing area which corresponds to at least one of the keys; and control means, when the at least one of the keys is pressed, for reading out the telephone number from the storing area corresponding to the at least one of the keys so as to make a call to the given station and for reading out the command from the storing area so as to send it to the given station in a manner to match a communication procedure of the given station.

According to another aspect of the present invention, a facsimile communication system comprises storing means for prestoring a character string which includes in a pair a telephone number of a given station and a first command for designating one of services offered from the given station and for executing a procedure for receiving the designated service; means for instructing an input of an individual information when a second command is detected in the first command, the second command requiring the input of the individual information; and control means for executing control of sending the telephone number, the command and the individual information.

According to still another aspect of the present invention, a facsimile communication system comprises first storing means for prestoring a character string which includes in a pair a first telephone number of a given station and a first command for designating one of services offered from the given station and for executing a procedure for receiving the designated service; second storing means for storing a second telephone number of another station; command generating means for inserting the second telephone number at a given position of the character string so as to generate a new character string; and control means, based on the new character string, for making a call to the given station and for executing a designation of one of the services and a procedure for receiving the designated service.

According to still another aspect of the present invention, a facsimile communication system comprises storing means for prestoring in a pair a telephone number of a given station and a command for designating one of services offered from the given station, the storing means further prestoring an identification mark before the command; and control means for detecting the identification mark so as to send the command as a PB signal after making a call to the given station based on the stored telephone number.

According to still another aspect of the present invention, a facsimile communication system comprises transmission control means for transmitting a telephone number of a given station and a command for designating one of services offered from the given station at a given time interval; means for counting the time interval; and control means, after completion of the transmission, for recording in a pair the telephone number and the command by adding a command indicative of the counted time interval.

According to still another aspect of the present invention, a facsimile communication system comprises recording means for recording in a pair a telephone number of a given station and a command for designating one of services offered from the given station with a given time interval therebetween; and control means, when receiving required image information from the given station in response to sending the command to the given station, for outputting the image information along with data indicative of the telephone number and the command.

According to still another aspect of the present invention, a facsimile communication system comprises recording means for recording in a pair a telephone number of a given station and a command for designating one of services offered from the given station with a given time interval therebetween; and control means for informing occurrence of an error to a user when a timing discrepancy occurs between a transmission timing of the command and a response from the given station while the command is transmitted with the given time interval.

According to still another aspect of the present invention, a facsimile communication system comprises recording means for recording as a character string a telephone number of a given station and a command for designating one of services offered from the given station with a given time interval therebetween; and display means for displaying a position of occurrence of an error in the character string when a timing discrepancy occurs between a transmission timing of the command and a response from the given station while the command is transmitted with the given time interval.

According to still another aspect of the present invention, a facsimile communication system comprises recording means for recording a character string including at least a telephone number of a given station and a command for designating one of services offered from the given station, the character string provided therein with a given time interval: and control means for automatically correcting the given time interval in the character string for retransmission when a timing discrepancy occurs between a transmission timing of the character string with the given time interval and a response from the given station.

According to still another aspect of the present invention, a facsimile communication system comprises operation means having a plurality of keys; recording means for recording a character string corresponding to at least one of the keys the character string including at least a telephone number of a given station and a command for designating one of services offered from the given station, the character string provided therein with a given time omitting the given time interval when the character string is transmitted by notifying the given station that an abbreviated transmission function for abbreviating a transmission procedure is available.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIG. 2 is a diagram showing an example of instruction words to be used in the first preferred embodiment;

FIG. 3 is a diagram showing an example of an image display performed by an instruction word "INN" according to the first preferred embodiment;

FIG. 4 is a diagram showing contents to be stored in a telephone directory area of a RAM according to the first preferred embodiment;

FIG. 5 is a diagram showing contents to be stored in an image display information area of the RAM according to the first preferred embodiment;

FIG. 18(A) is a diagram showing an image of "information retrieval menu" which is displayed on a display unit when an information retrieval key on a keyboard is pressed;

FIG. 18(B) is a diagram showing an image of "service selection menu" which is displayed on the display unit when a recorded dialing procedure is to be selected for execution;

FIG. 18(C) is a diagram showing an image which is displayed on the display unit when one of recorded dialing procedures is executed;

FIGS. 19(A), 19(B) and 19(C) are diagrams, respectively, showing images which are displayed in turn on the display unit in time sequence, according to the third preferred embodiment;

FIG. 22(A) is a diagram showing an example of an image to be displayed according to fourth preferred embodiment, wherein generation of an error and its position on a dialing procedure are shown;

FIG. 22(B) is a diagram of an example of an image to be displayed according to the fourth preferred embodiment, wherein the error in FIG. 22(A) is corrected;

DESCRIPTION OF THE PREFERRED EMBODIMENT

Now, preferred embodiments of the present invention will be described hereinbelow with reference to the accompanying drawings.

Figure 1:
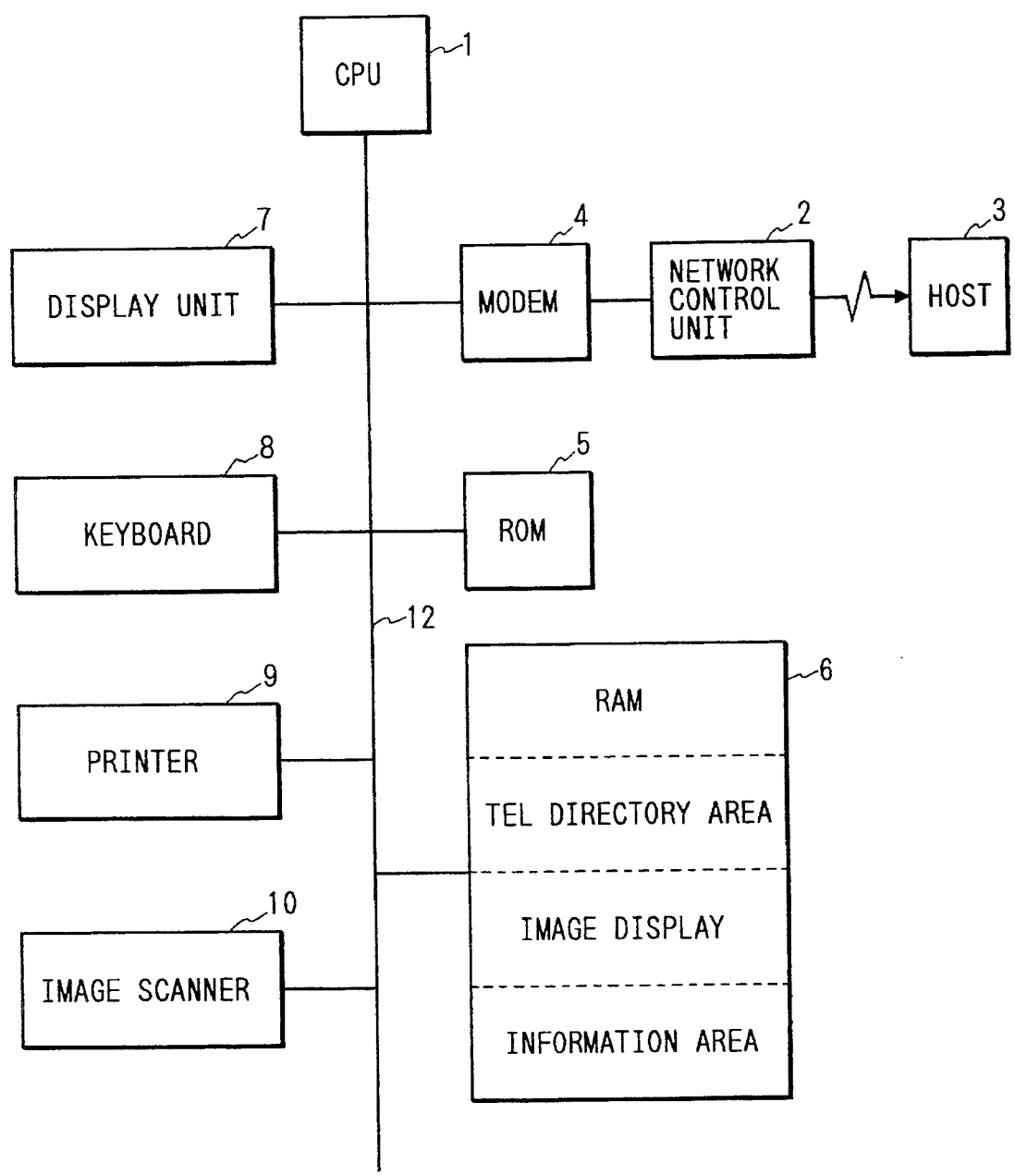
FIG. 1 is a block diagram showing a schematic structure of a user's terminal facsimile apparatus according to a first preferred embodiment of the present invention.

FIG. 1 is a block diagram showing a schematic structure of a user's terminal facsimile apparatus according to a first preferred embodiment of the present invention.

In FIG. 1, a CPU 1 controls the overall operations of the terminal facsimile apparatus, a network control unit 2 controls connection between the terminal facsimile apparatus and an external apparatus, such as, a host 3 via a telephone network. The host 3 is composed of a store-and-forward switching apparatus. A modem 4 performs modulation of an outgoing signal to be sent through the telephone network and demodulation of an incoming signal received through the telephone network. A ROM 5 stores various programs to be executed by the CPU 1, and a RAM 6 provides a working area for the CPU 1 to execute the program read out from the ROM 5. A telephone directory area and an image display information area, which will be described later in detail, are also set in the RAM 6. A display unit 7 displays information, such as, an ongoing operation, an inputted telephone number and an operation guidance for an input instruction for the user. A keyboard 8 is used for inputting, such as, a telephone number and other information as required on the display unit 7. A printer 9 prints incoming image data sent through the telephone network on a recording paper, and an image scanner 10 read in outgoing data to be sent through the telephone network. Numeral 12 denotes a bus for data transfer among the foregoing components.

FIG. 2 shows one example of instruction words to be used in the first preferred embodiment. In FIG. 2, "INN" is an instruction or command for displaying an image identified by a number "NN", inputting required data in the displayed image, and storing the data inputted by the user at an address "NN" of a later-described inputted data storing area in the RAM 6. "ONN" is an instruction or command for sending the data stored at the address "NN" of the inputted data storing area to the host 3. "T" is an instruction or command for sending numeric data arranged after "T" in the form of a PB signal. The numeric data select or identify a service to be offered by the host 3. Accordingly, by using the instruction word "T", the numeric data indicative of the service to be offered can be reliably sent to the host 3 as the PB signal even when a call is made to the host 3 with a telephone number in the form of dial pulses. Further, by putting a later-described instruction word "E" before "T", the PB signal can be sent to the host after confirming a closed state of a telephone line, that is, after confirming connection to the host.

"WNN" is an instruction or command for pausing or waiting for a time period specified by "NN". "X" is an instruction or command for setting to a facsimile receiving mode, and "Y" is an instruction or command for setting to a facsimile transmitting mode. "E" is an instruction or command for pausing or waiting until detection of a polarity reverse at the telephone line. "MNN" is an instruction or command for reading out data identified by an abbreviated number "NN" in the telephone directory area and for linking such data to an instruction string being currently executed. "SN" and "MDN" are instructions or commands, respectively, each of which determines a transmission mode of the user's facsimile apparatus. As appreciated, operation parameters of the user's facsimile apparatus are not limited to "SN" and "MDN".

How to combine and use the instruction words will be described later in detail.

FIG. 3 shows an example of the image display performed by the instruction word "INN". In FIG. 3, the displayed image requires an input of an examinee's number which is necessary for requesting the facsimile communication service of the trial examination result. An F1 key is for correcting the inputted examinee's number, and an F2 key is for confirming tile inputted examinee's number so as to make it definitive. By executing the command of "INN", the designated image is displayed on the display unit 7 so as to require the input of some identification number variable according to the user, such as, the examinee's number, before making a call to the host 3. This makes it possible not only to send the instruction string recorded in the telephone directory area of the RAM 6 to the hose 3, but also to add the data variable per user to the stored instruction string so as to be sent to the host 3.

As appreciated. FIG. 3 shows only one example of the image display executed by the instruction "INN", meaning that an image to be displayed can be set in different manners according to demands.

FIG. 4 shows contents to be stored in the telephone directory area in the RAM 6. Specifically, the telephone directory area includes items or titles of the communication services offered by the host 3, and a dialing content or procedure for each of the titles of the communication services. Each of the dialing contents represents a procedure for sending the data to the host 3 using the foregoing instruction words. The telephone directory area further includes a data length of each of the dialing contents. As seen in FIG. 4, each of the titles of the communication services are identified by an abbreviated number of two digits. For example, the dialing content for the communication service of "requesting trial examination result" as identified by an abbreviated number "00" is as follows:

"I00": This corresponds to the foregoing command "INN". Accordingly, this command displays an image like that in FIG. 3 and requires the user to input some identification number, such as, the examinee's number. "00" after "I" designates data which is identified by "00" in the image display information area in FIG. 5. Accordingly, the image is displayed on the display unit 7 according to the stored data identified by "00" in FIG. 5. Further, the data inputted by the user is stored at an address "00" of the inputted data storing area shown in FIG. 5.

"0334911100": This represents the telephone number of the host 3.

"W10": This corresponds to the foregoing command "WNN". According to this command, the user's facsimile apparatus waits or pauses for 10 seconds which are necessary for connection to the host 3 via the telephone line.

As appreciated, each of the dialing contents as identified by the abbreviated numbers "01" and "02" includes the command "E" for waiting until detection of a polarity reverse. Instead of "W10", the dialing content identified by "00" may include the command "E", which may provide a more reliable result since a subsequent process is executed after detection of connection to the host 3.

"T1234": "1234" represents a service to be offered by the host 3. Accordingly, the command "T1234" is for sending the data "1234" indicative of the selected service in the form of a PB signal.

"O00": This corresponds to the foregoing command "ONN". Accordingly, the command "O00" is for reading out the data, such as, the examinee's number inputted by the user and stored at the address "00" in the inputted data storing area in the RAM 6 according to the command "I00", and for sending it to the host 3 after "T1234".

"W10X": This command is for setting the user's facsimile apparatus to the facsimile receiving mode after waiting for ten seconds.

When the instruction string as described above is executed in time sequence, the service of "requesting trial examination result" as identified by the abbreviated number "00" can be offered from the host 3.

On the other hand, when a data length of the dialing content is longer than a predetermined length, it is advantageous to use the command "MNN". For example, the dialing content corresponding to "03" in FIG. 4 requires a service of "requesting trial examination guidance", that is, this dialing content requires the host 3 to transmit the trial examination guidances to a plurality of other terminal facsimile apparatuses simultaneously. However, due to the limitation to the data length, it is practically impossible to record telephone numbers of those terminal facsimile apparatuses at an area designated by one abbreviated number. In this case, by using the command "MNN", areas designated by abbreviated numbers "04" and "05" can be effectively utilized for the dialing content corresponding to "02". Specifically, this dialing content includes "M04" while the area designated by "04" includes "0339700211" which is a telephone number of one of the two facsimile apparatuses to which the guidance is to be sent from the host 3, and "M05". On the other hand, the area designated by "05" includes a telephone number of the other of the foregoing two facsimile apparatuses. Accordingly, the command "M04" in the dialing content represents the telephone numbers of the two facsimile apparatuses, and thus allows the user's facsimile apparatus to link and send the data in the areas designated by "04" and "05" after "T2121" which identifies the service corresponding to "03" in FIG. 4. As a result, by means of the command "MNN", even an instruction string having a data length longer than the predetermined length in substance can also be recorded in the telephone directory area.

As appreciated, it is also possible to input the telephone number of the facsimile apparatus to which the guidance is to be sent from the host 3, using the command "INN" before making a call to the host 3. However, in this case, the input operation of the telephone number by the user is required every time the guidance is required for that telephone number. In this regard, it is beneficial to use the command "MNN" for those terminal facsimile apparatuses where the number of receiving operations from the host 3 in the same service is large, and to use the command "INN" for those terminal facsimile apparatuses where the receiving operation number is not large. Further, by including the command "SN" and/or "MDN" in the dialing contents corresponding to, such as, "04" and "05", the transmission mode of the user's facsimile apparatus can be automatically selected depending on a called station as designated by the recorded abbreviated number.

The contents in the telephone directory area in FIG. 4 and in the image display information area in FIG. 5 are recorded and changed by the user, which will be described hereinbelow with regard to the communication service of "requesting trial examination result".

The user first pushes a telephone directory key on the keyboard 8 so as to display the telephone directory area of FIG. 4 on the display unit 7. If "00" is selected as an abbreviated number for identifying the service of "requesting trial examination result", the user inputs "requesting trial examination result" in a column of "title of service" as corresponding to the abbreviated number "00". Subsequently, in a column of "dialing content", the user inputs "I00". This means that data to be inputted by the user will be stored at an address designated by "00" in the inputted data storing area of the image display information area in FIG. 5 in the RAM 6. Subsequently, the user inputs the telephone number "03349 11100" of the host 3.

Thereafter, in order for the user's facsimile apparatus to be set to the PB signal mode with an interval of 10 seconds after transmission of the host telephone number, the user inputs "W10T" after the host telephone number. Accordingly, the service number "1234" to be inputted next for representing "requesting trial examination result" is sent to the host 3 in the form of the PB signal. After the service number, the user inputs "O00". This means that the data inputted by the user and stored at the address designated by "00" in the inputted data storing area of the RAM 6 is sent to the host 3 after transmission of the service number. Subsequently, the user inputs "W10X". This means that the user's facsimile apparatus is shifted to the facsimile receiving mode so as to send the CED signal after ten seconds of the transmission of the data effected by the command "O00".

In the foregoing manner, the area corresponding to the abbreviated number "00" in the telephone directory area in FIG. 4 has been recorded with the necessary contents.

Now, processes achieved by the thus recorded dialing content including various instruction words will be described hereinbelow in detail.

Figure 6:
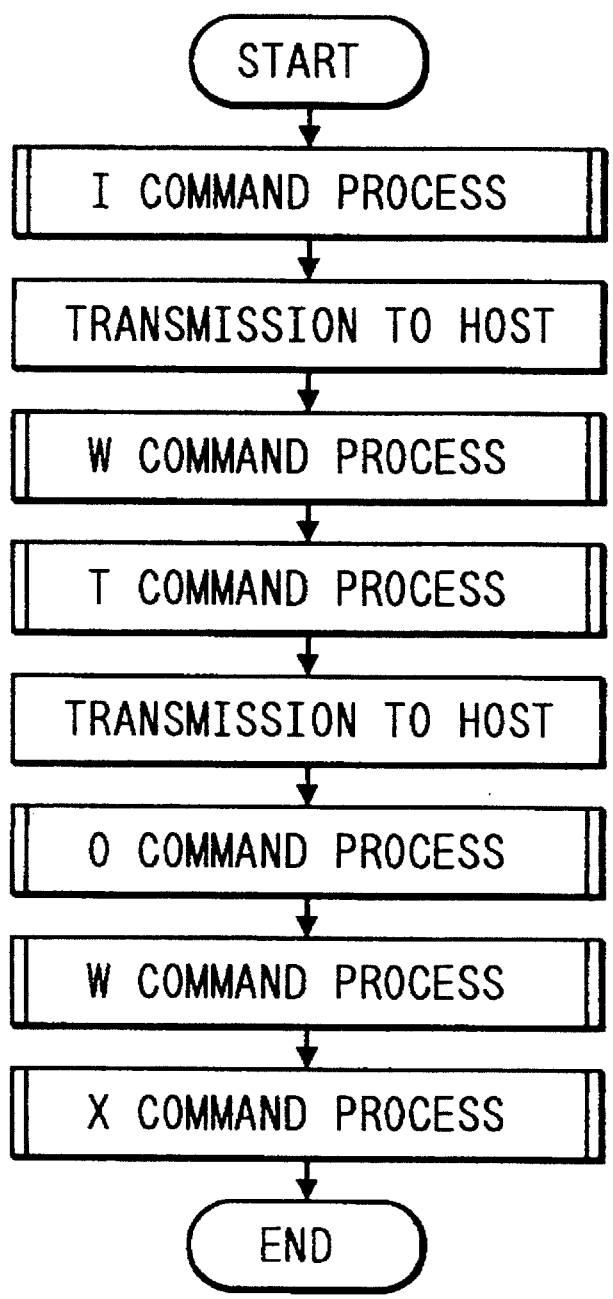
FIG. 6 is an overall flowchart showing a dialing content of "requesting trial examination result" as a combination of command processes according to t,he first preferred embodiment.

FIG. 6 is an overall flowchart showing the dialing content of "requesting trial examination result" corresponding to "00" as a combination of the instruction or command processes.

Figure 7:
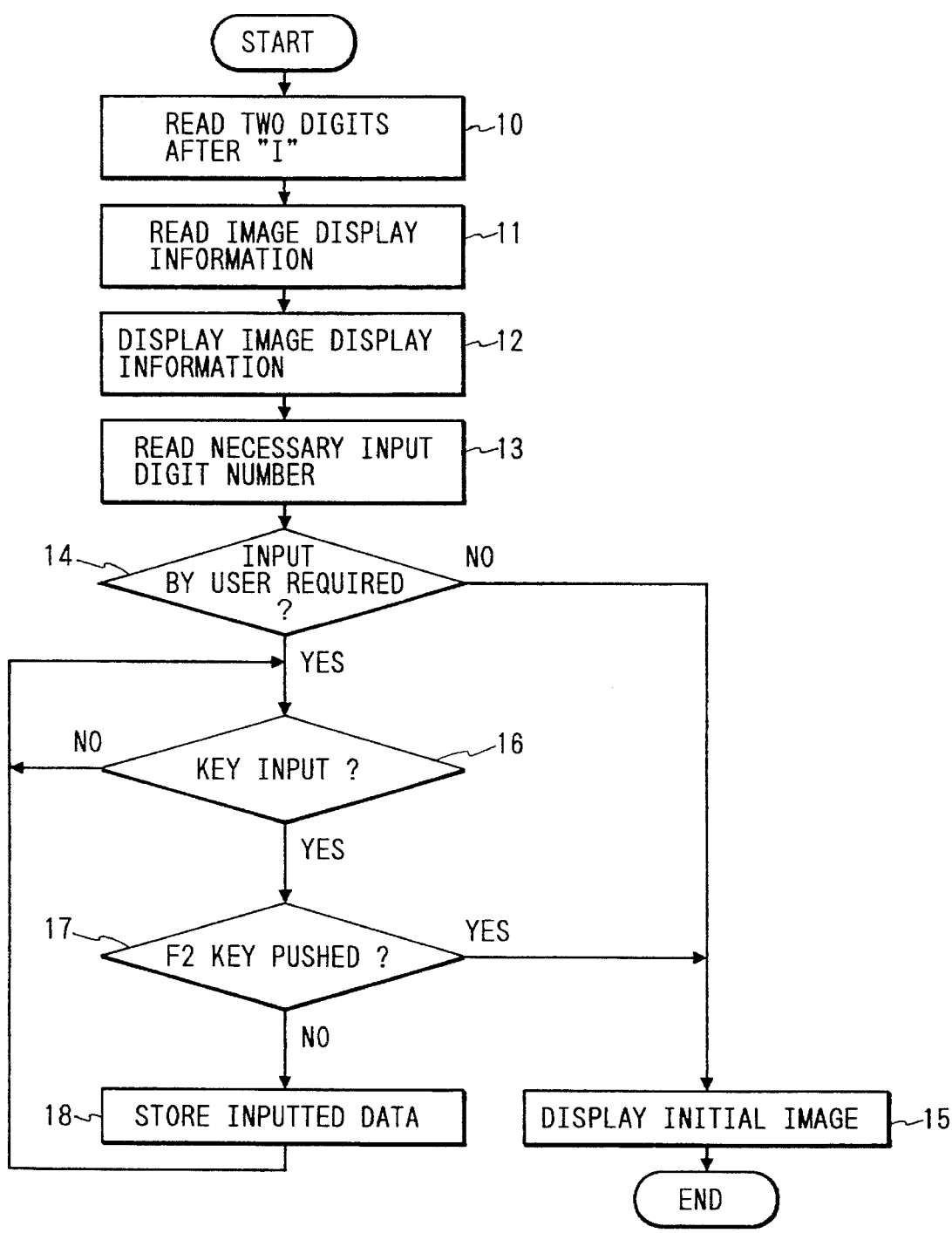
FIG. 7 is a flowchart of an I command process shown in FIG. 6.

FIG. 7 is a flowchart of the I command process shown in FIG. 6. In FIG. 7, step 10 reads out two digits after "I" in the dialing content corresponding to the abbreviated number "00" in FIG. 4. Accordingly, step 10 reads out "00". Subsequently, step 11 reads out the image display information corresponding to "00" in the image display information area of FIG. 5, and step 12 displays the read-out information on the display unit 7. The information displayed at step 12 is as shown in FIG. 3 and requires the input of the examinee's number by the user. Subsequently, step 13 reads out the required digit number to be inputted from "required input digit number information" corresponding to "00" in FIG. 5. In case of FIG. 3, the required input digit number is "8". The process now advances to step 14 which determines whether the input by the user is required in the displayed image on the display unit 7. If not required, the process advances to step 15 where the display unit 7 cancels the image displayed at step 12 and displays an initial image which may be the image as shown in FIG. 4 or the like. On the other hand, when the input by the user is required as determined at step 14, the process advances to step 16 which determines whether there is an input from the keyboard 8 by the user. If positive at step 16, step 17 determines whether the F2 key in FIG. 3 is pushed, that is, whether the required input digit number is reached and the inputted data is confirmed by the user. If negative at step 17, a step 18 stores in turn data inputted at step 16 in the inputted data storing area corresponding to "00" in FIG. 5. If answer at step 17 becomes positive, the process stores the inputted data in the inputted data storing area as the definitive data and advances to step 15.

Figure 8:
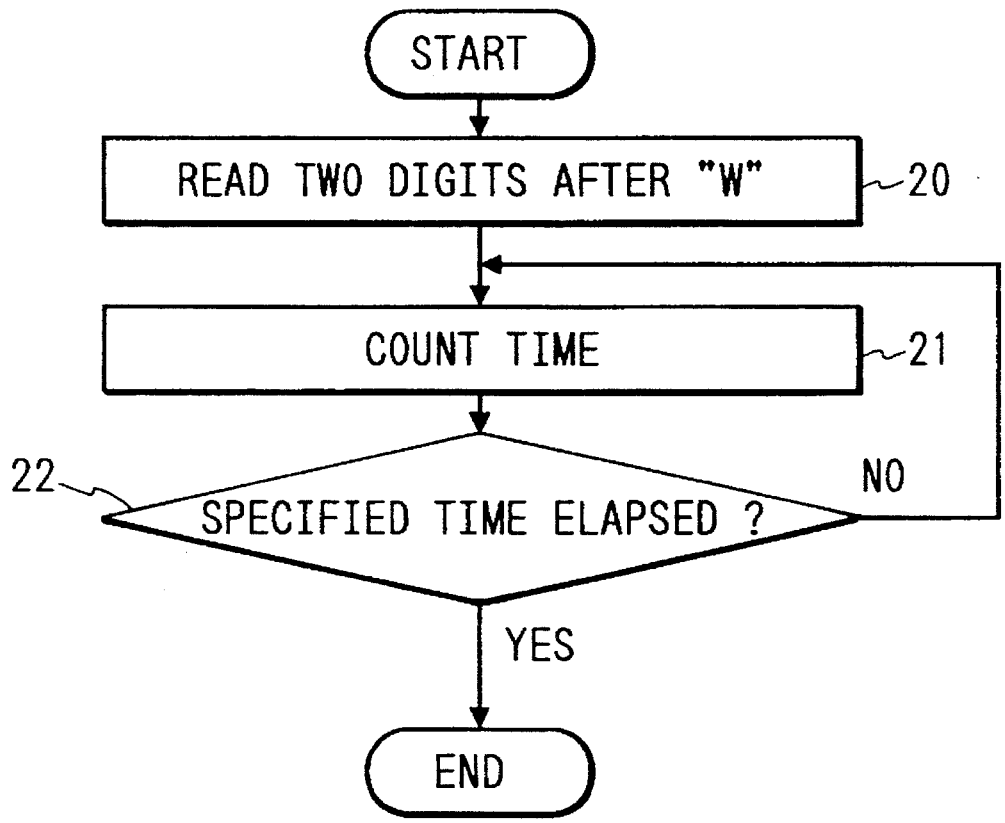
FIG. 8 is a flowchart of a W command process shown in FIG. 6.

FIG. 8 is a flowchart of W command process shown in FIG. 6. In FIG. 8, step 20 reads out two digits after "W" in the dialing content corresponding to "00" in FIG. 4. Accordingly, step 20 reads out "10" which represents ten seconds. Subsequently, a step 21 starts counting a time using a timer in the CPU 1. A subsequent step 22 checks whether a time specified by the read-out two digits, that is, ten seconds in this case, has elapsed. If answer at step 22 becomes positive, the W command process is finished.

Figure 9:
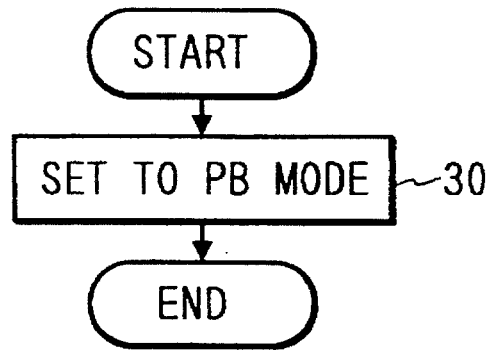
FIG. 9 is a flowchart of a T command process shown in FIG. 6.

FIG. 9 is a flowchart of the T command process shown in FIG. 6. In the T command process, step 30 sets the user's facsimile apparatus to the PB signal mode in transmitting the numeric data which identifies the title or kind of the service to offered by the host 3.

Figure 10:
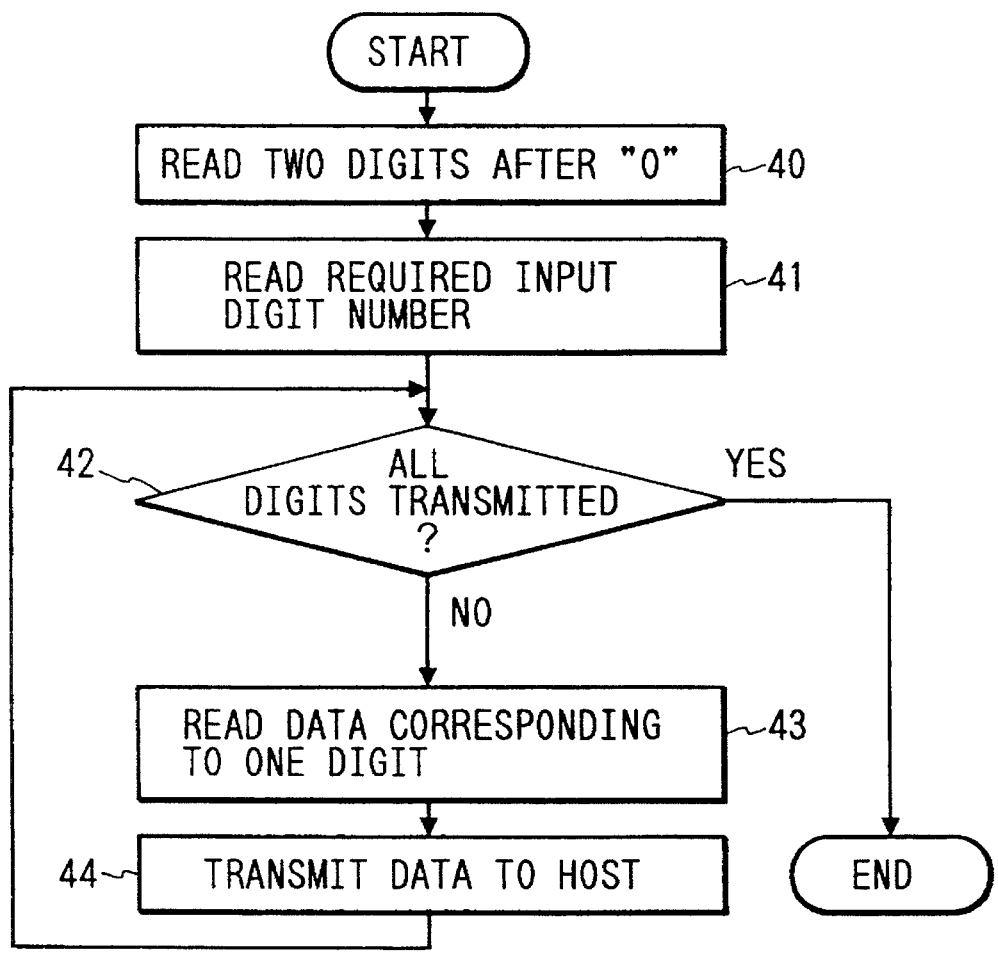
FIG. 10 is a flowchart of an 0 command process shown in FIG. 6.

FIG. 10 is a flowchart of the O command process shown in FIG. 6. In FIG. 10, step 40 reads out two digits after "0 in the dialing content corresponding to "00" in FIG. 4. Accordingly, step 40 reads out "00". Subsequently, step 41 reads out the input digit number stored in "required input digit number" corresponding to "00" in FIG. 5. Thereafter, step 43 reads out in turn one digit of the data stored in "inputted data storing area" corresponding to "00" in FIG. 5, and step 44 transmits the read-out data corresponding to one digit to the host 3. Steps 43 rand 44 are repeated until the number of the digits read out at step 43 and transmitted at step 44 reaches the required input digit number read out at step 41. When the digit number transmitted to the host 3 reaches the required input digit number, step 42 produces positive answer so that the O command process is finished.

Figure 11:
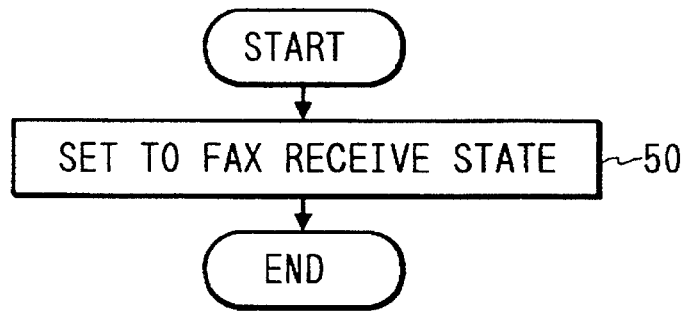
FIG. 11 is a flowchart of an X command process shown in FIG. 6.

FIG. 11 is a flowchart of the X command process shown in FIG. 6. In the X command process, step 50 sets the user's facsimile apparatus to the facsimile receiving state so as to start the facsimile communication with the host 3.

Now, operations for the user to receive the communication service from the hose 3 using the recorded dialing content will be described with regard to "requesting trial examination result" corresponding to "00" in FIG. 4.

Figure 12:
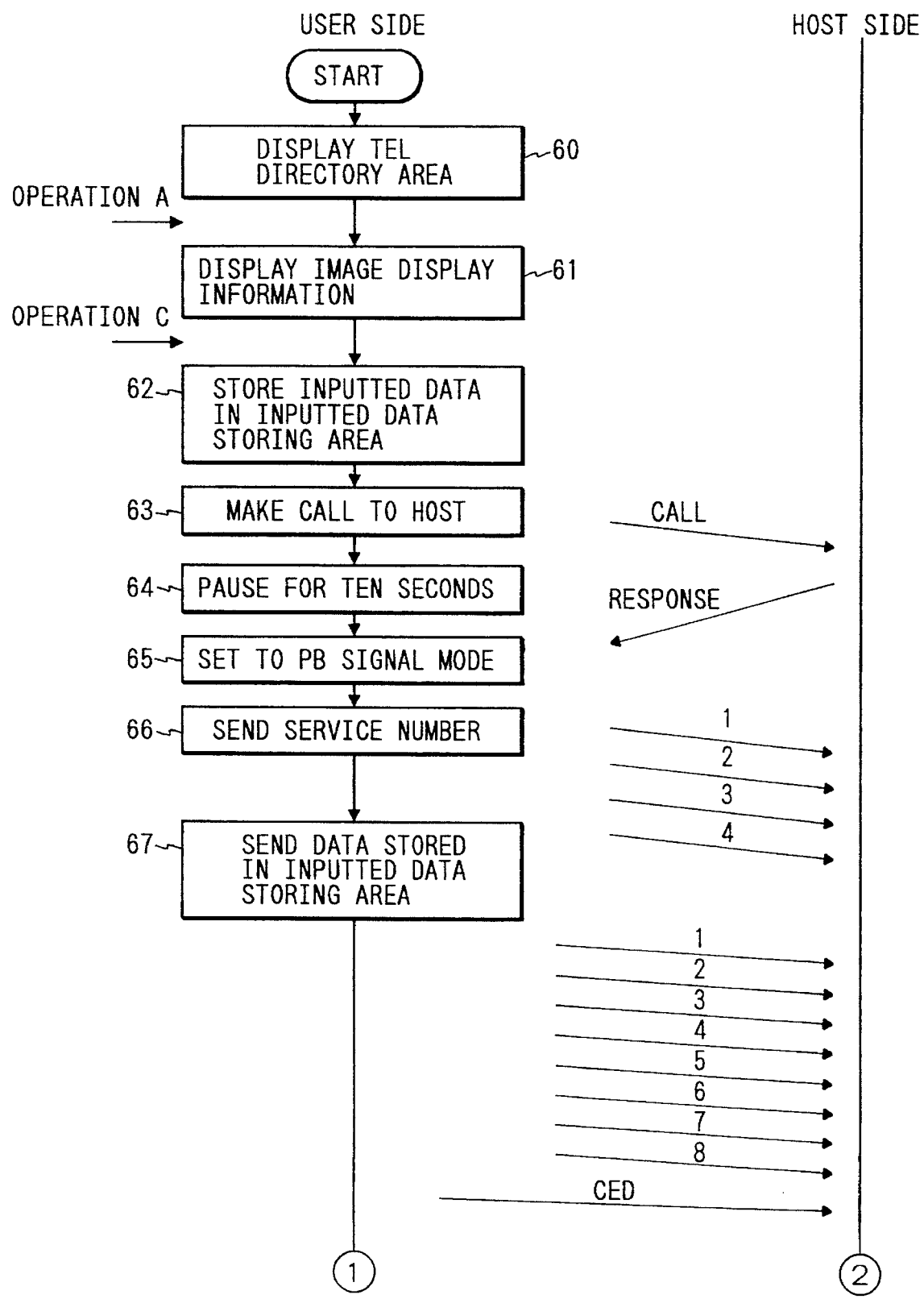
FIGS. 12 and 13 are time-domain diagrams for explaining operations of the user's facsimile apparatus and a host with regard to a communication service of "requesting trial examination result" according to the first preferred embodiment.
Figure 13:
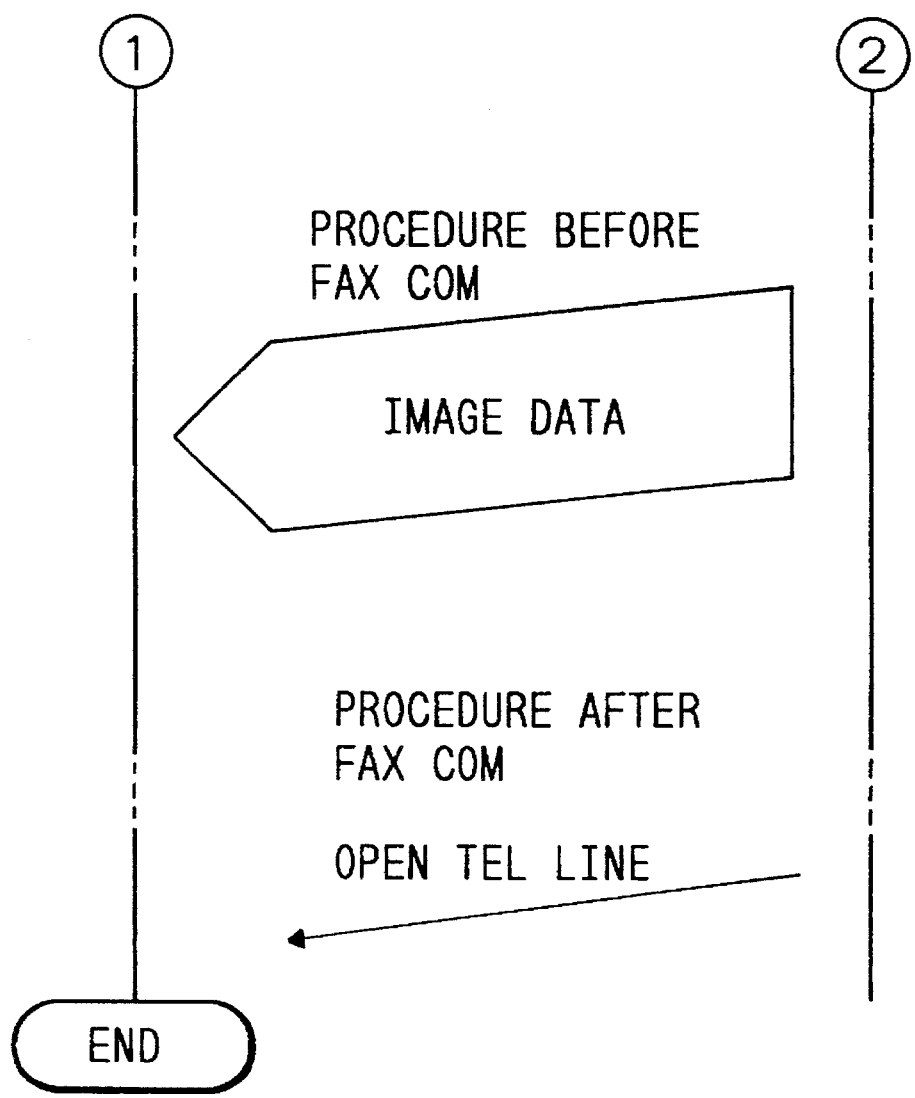

FIGS. 12 and 13 are time-domain diagrams for explaining operations of the user's facsimile apparatus and the host 3 with regard to the communication service of "requesting trial examination result".

In these figures, at step 60, the user pushes the telephone directory key on the keyboard 8 so as to display the telephone directory area of FIG. 4 on the display unit 7. Subsequently, in an operation A, the user presses to select the abbreviated number "00" on the displayed image. Based on the operation A, the CPU 1 starts to execute the process "1000334911100W10T1234000W10X". Specifically, at step 61, the CPU 1 displays on the display unit 7 the image display information corresponding to "00" in FIG. 5. In response to the direction displayed on the display unit 7, the user inputs the desired examinee's number, for example, "12345678" and pushes the F2 key in an operation C.

Subsequently, at step 62, the CPU 1, based on the command "I00", inputs the examinee's number "12345678" in the inputted data storing area corresponding to "00" in FIG. 5. Thereafter, step 63 makes a call to the host 3 based on the telephone number "0334911100". The user's facsimile apparatus pauses for ten seconds at step 64 and then is set to the PB signal mode at step 65 in response to the commands "W10T". Subsequently, step 66 sends the service number of "requesting trial examination result" to the host 3 by dialing "1234". Thereafter, based on the command "000", step 67 reads out the examinee's number "12345678" from the inputted data storing area corresponding to "00" in FIG. 5 and sends it to the host 3. Further, based on the commands "W10X", the CED signal is transmitted to the host 3 after lapse of ten seconds so that the facsimile communication is executed with the host 3.

As appreciated from the foregoing description, in the first preferred embodiment, the required information with regard to "requesting trial examination result" can be obtained with the less number of the operations as compared with the aforementioned prior art.

Now, a second preferred embodiment of the present invention will be described hereinbelow with regard to the communication service of "sending trial examination answer" as identified by the abbreviated number "01" in FIG. 4. Accordingly, in the second preferred embodiment, the answer to the trial examination is transmitted from the user's facsimile apparatus to the host 3.

Figure 14:
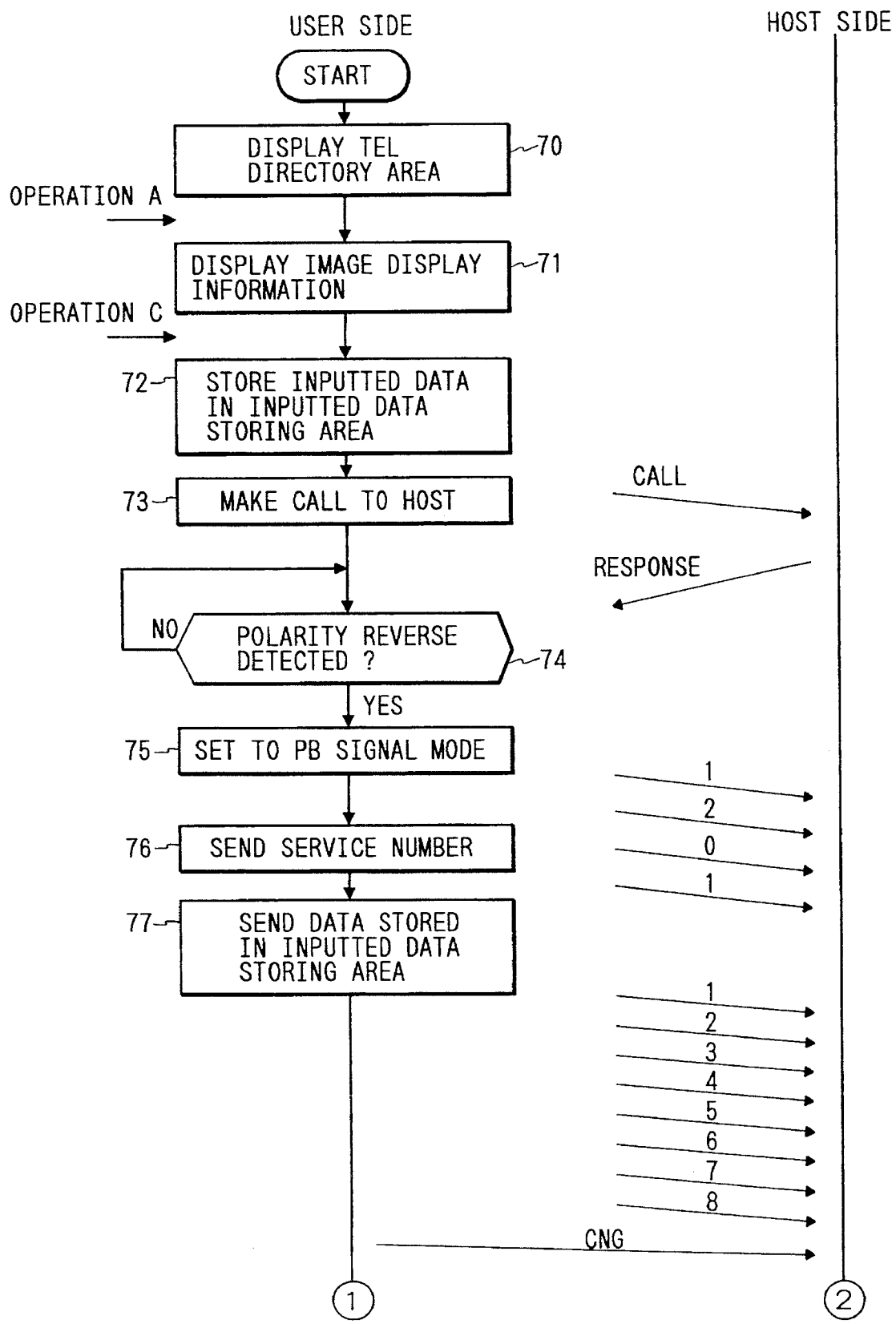
FIGS. 14 and 15 are time-domain diagrams for explaining operations of the user's facsimile apparatus and the host with regard to a communication service of "sending trial examination answer" according to a second preferred embodiment of the present invention.
Figure 15:
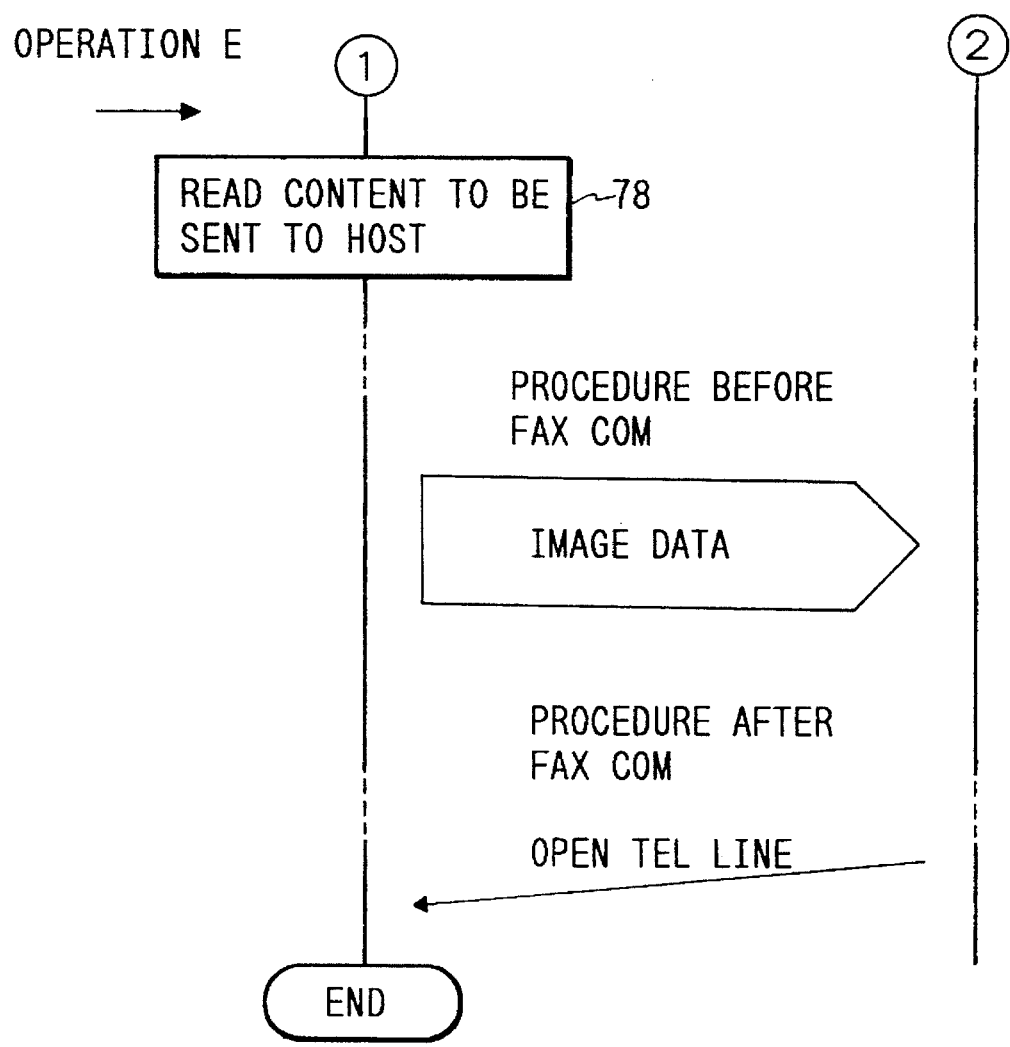

FIGS. 14 and 15 are time-domain diagrams for explaining operations of the user facsimile apparatus and the host 3 with regard to the communication service of "sending trial examination answer".

In these figures, at step 70, the user pushes the telephone directory key on the keyboard 8 so as to display the telephone directory area of FIG. 4 on the display unit 7. Subsequently, in an operation A, the user presses to select the abbreviated number "01" on the displayed image. Based on the operation A, the CPU 1 starts to execute the process "I100334911100ET1201010W10Y". Specifically, at step 71, the CPU 1 displays on the display unit 7 the image display information corresponding to "01" in FIG. 5. In response to the direction displayed on the display unit 7, the user inputs the examinee's number, for example, "12345678" and pushes the F2 key in an operation C.

Subsequently, at step 72, the CPU 1, based on the command "I10", inputs the examinee's number "12345678" in the inputted data storing area corresponding to "01" in FIG. 5. Thereafter, step 73 makes a call to the host 3 based on the telephone number "0334911100". At step 74, the user's facsimile apparatus pauses until the polarity reverse is detected, that is, until the host 3 answers the call from the user's facsimile apparatus. When step 74 produces positive answer, the process advances to step 75 which sets the user's facsimile apparatus to the PB signal mode. Subsequently, step 76 sends the service number of "sending trial examination answer" to the host 3 by dialing "1201". Thereafter, based on the command "010", step 77 reads out the examinee's number "12345678" from the inputted data storing area corresponding to "01" in FIG. 5 and sends it to the host 3. Further, based on the commands "W10Y", a CNG signal, which is a facsimile communication start indicative signal, is transmitted to the host 3 after lapse of ten seconds. Simultaneously, at step 78, the image scanner 10 reads the trial examination answer to be transmitted to the host 3. Thereafter, the trial examination answer read by the image scanner 10 is sent to the host 3 in the known manner.

In the foregoing first and second preferred embodiments, the recording of the contents into the telephone directory area of the RAM 6 in FIG. 4 is described to be performed by the user. However, those contents may be downloaded from the host 3.

Before describing a third preferred embodiment of the present invention, a communication sequence between the user's facsimile apparatus and the host 3 will be described with reference to FIG. 16. The communication sequence of FIG. 16 relates to the communication service of "requesting trial examination result" when the corresponding dialing content or procedure in FIG. 4 is executed.

Figure 16:
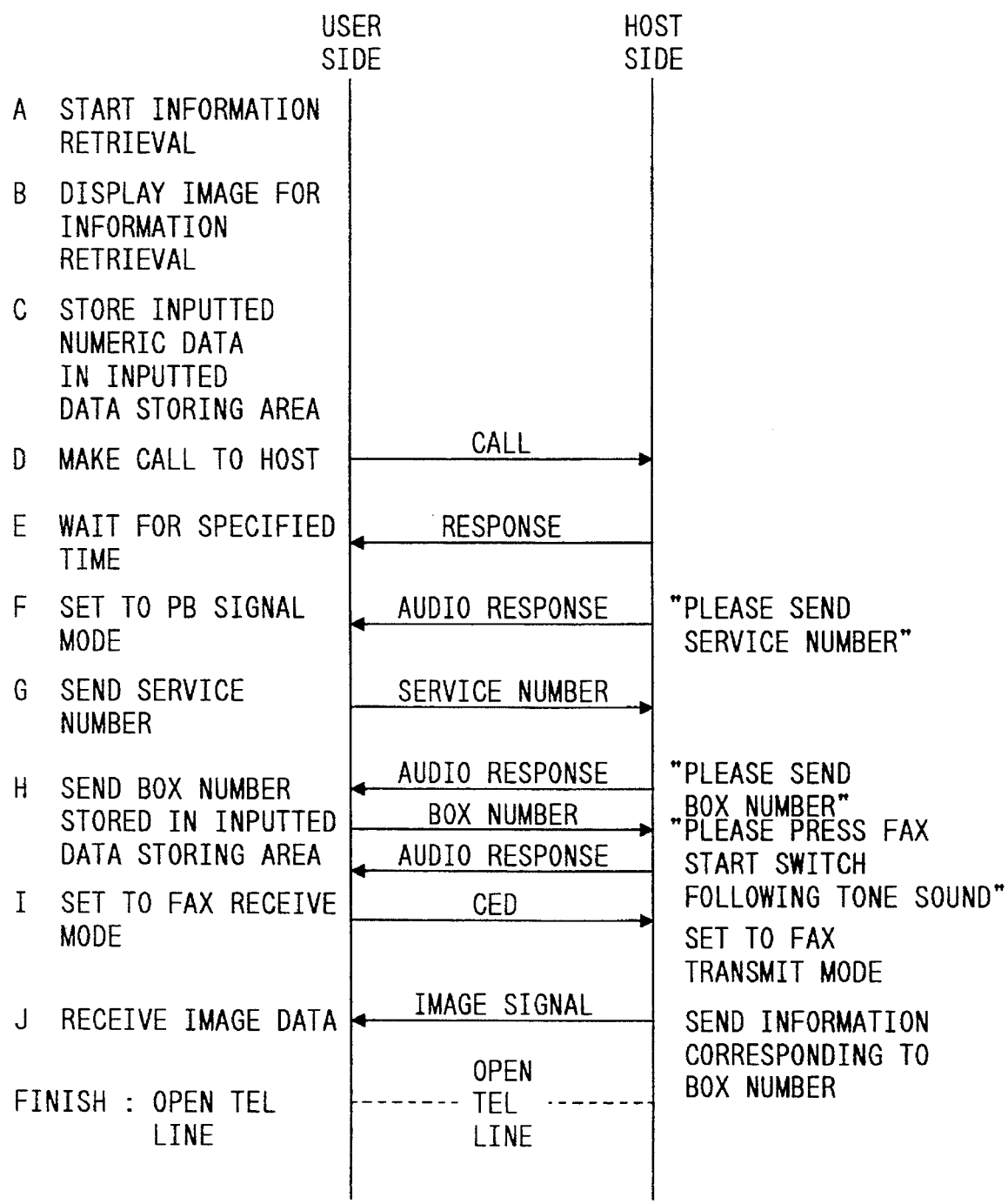
FIG. 16 is a time-domain diagram showing a communication sequence between the user's facsimile apparatus and the host with regard to a communication service of "requesting trial examination result" when a corresponding dialing content is executed.

In FIG. 16, at step A, in order to start a retrieval for available communication services, the user presses the telephone directory key on the keyboard 8. At step B, the image of the telephone directory area shown in FIG. 4 is displayed on the display unit 7. When the abbreviated number "00" is selected, the image of FIG. 3 is displayed. When the examinee's number of eight digits is inputted, the inputted eight digit number is stored in the inputted data storing area of the RAM 6 in FIG. 5 at step C. Now, the dialing content for the corresponding communication service is completed so as to be executed at step D where a call is made to the host 3. In response to this call, the host 3 answers by closing the telephone line and then sends an audio response or message "Please send the service number." On the other hand, based on the commands "W10T", the user's facsimile apparatus pauses, at step E, for ten seconds after the call at step D, and then is set to the PB signal mode at step F so as to send the service number at step G. This "ten seconds" specified by "W10" is an estimated time period from the termination of the call to the termination of the audio message so that the service number is sent to the host 3 from the user's facsimile apparatus regardless of the audio message from the host 3. Accordingly, when the termination of the audio message is delayed to exceed ten seconds of the termination of the call, the audio message and the service number overlap with each other so that the host 3 can not receive the service number precisely to cause failure. This also applies to the case where the command "E" is used to pause the user's facsimile apparatus until the polarity reverse is detected, that is, until the telephone line is closed. Specifically, even if the command "E" is used, it is difficult to precisely estimate the termination of the audio message from the host 3 after the detection of the polarity reverse.

Subsequently, the host 3 sends an audio message "Please send a box number." The box number corresponds to the examinee's number. On the other hand, at step H, the user's facsimile apparatus sends the box number stored in the inputted data storing area in FIG. 5 in response to the command "000", regardless of the audio message from the host 3. Subsequently, the host 3 sends an audio message "Please press a facsimile communication start switch following a tone sound at the end of the message." On the other hand, at step I, the user's facsimile apparatus sends the CED signal to the host 3 after lapse of ten seconds of the transmission of the box number in response to the commands "W10", regardless of the audio message from the host 3.

Accordingly, as appreciated, after making the call at step D, the host 3 and the user's facsimile apparatus perform the transmitting operations with respectively predetermined time intervals independent of each other. As a result, if the estimated time intervals are not precise, the data transmitted from the user's facsimile apparatus can not be inputted to the host 3 as effective data.

After receipt of the CED signal, the host 3 is set to the facsimile transmitting mode so as to send the required information corresponding to the box number. Accordingly, the user's facsimile apparatus receives the transmitted information at step J and opens the telephone line when the receipt is finished.

The third preferred embodiment is aimed to eliminate the above-noted problem caused by the timing discrepancy between the host 3 and the user's facsimile apparatus. Specifically, in the third preferred embodiment, when the instruction string, that is, the dialing procedure in FIG. 4, is newly produced and recorded, the respective time intervals are automatically counted by the CPU 1 after a call is made to the host 3. As a result, for example, when one of the time intervals is ten seconds, the W command of "W10" is automatically produced and recorded.

Figure 17:
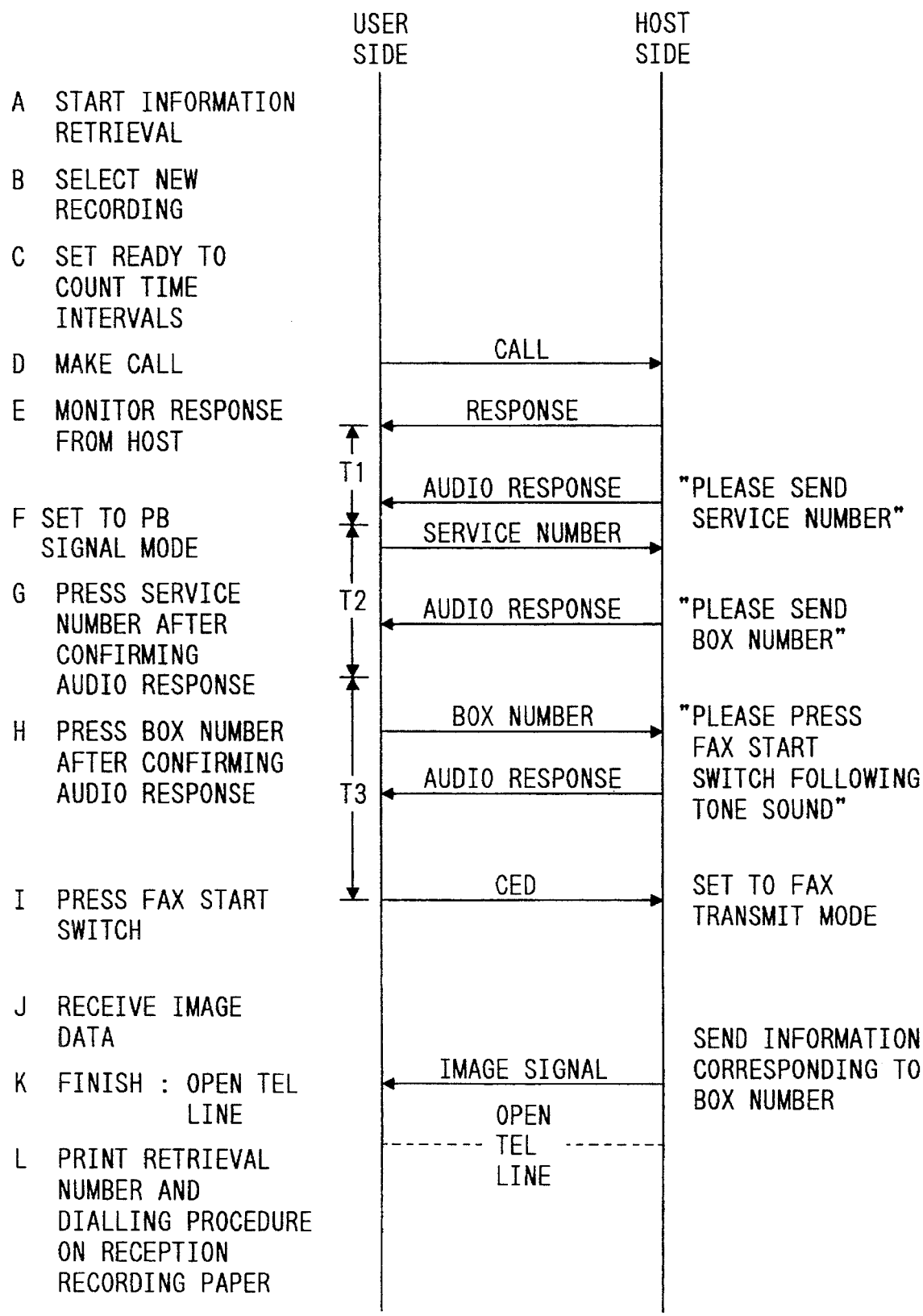
FIG. 17 is a time-domain diagram showing a communication sequence between the user's facsimile apparatus and the host according to a third preferred embodiment of the present invention.

FIG. 17 is a time-domain diagram showing a communication sequence between the user's facsimile apparatus and the host 3 according to this preferred embodiment. FIG. 18(A) shows an image of "information retrieval menu" which is displayed on the display unit 7 when an information retrieval key on the keyboard 8 is pressed. FIG. 18(B) shows an image of "service selection menu" which is displayed on the display unit 7 when the recorded dialing procedure is to be selected for execution. FIG. 18(C) shows an image which is displayed on the display unit 7 when one of the recorded dialing procedures is executed. FIGS. 19(A), 19(B) and 19(C) show images which are in turn displayed on the display unit 7 in time sequence.

In FIG. 17, at step A, in order to start an information retrieval, the user presses the information retrieval key on the keyboard 8 so as to display the information retrieval menu on the display unit 7 as shown in FIG. 18(A). When a number "1" is selected in FIG. 18(A), a list of the facsimile information services already recorded is displayed as shown in FIG. 18(B). When one of the information services is selected in FIG. 18(B), the corresponding dialing procedure is displayed along with an ongoing execution state thereof as shown in FIG. 18(C).

On the other hand, when a number "2" is selected in FIG. 18(A) at step B in FIG. 17, that is, when new recording of a dialing procedure is selected, the user's facsimile apparatus is set ready to count time intervals with respect to inputs of a telephone number of the host 3, a service number identifying the service to be offered and a box number specifically identifying the information to be offered, at step C. The time intervals are counted by a time counting means which is incorporated in the CPU 1.

A new dialing procedure is produced in the following manner:

At step D, the telephone number, such as, "1234567" of the host 3 is inputted using the keyboard 8 so as to make a call to the host 3. The call may also be made using the stored telephone number. Subsequently, at step E, the response from the host 3 is monitored. Specifically, the step E monitors the polarity reverse at the telephone line. In practice, the polarity reverse is monitored by the foregoing command "E". At step F, the user's facsimile apparatus is set to the PB signal mode, which is performed by the command "T". After the polarity reverse, the host 3 sends an audio response "Please send a service number." In response to this audio response, the user inputs the required service number, such as, "2121" using the keyboard 8 so as to be sent to the host 3, at step G. A time T1 from tile polarity reverse to the start of pressing the service number is counted. In this case, if the counted time is 3 seconds, the dialing procedure includes a character string "—ETW3". FIG. 19(A) shows this process.

Subsequently, the host 3 sends an audio response "Please send a box number." In response to this audio response, the user presses the box number, such as, "87654321" using the keyboard 8 so as to be sent to the host 3, at step H. A time T2 from the termination of pressing the service number to the start of pressing the box number is counted. In this case, if the counted time is 10 seconds, the dialing procedure includes a character string "—W1087654321". FIG. 19(B) shows this process.

Subsequently, the host sends an audio response "Please press a facsimile communication start switch following a tone sound." . In response to this audio response, the user presses the facsimile communication start switch at step I. A time T3 from the termination of pressing the box number to the pressing of the facsimile communication start switch is counted. In this case, if the counted time is 5 seconds, the dialing procedure includes a character string "—87654321W5X" as shown in FIG. 19(B). As appreciated, "X" represents the command for setting the user's facsimile apparatus to the facsimile receiving mode. The production of the new dialing procedure is now finished.

When the facsimile communication start switch is pressed, the CED signal is sent to the host 3. In response to the CED signal, the host 3 is set to the facsimile transmitting mode and sends the image data which is then received by the user's facsimile apparatus at step J. The telephone line is closed at step K and the newly-produced produced dialing procedure and a corresponding retrieval number are printed on a reception recording paper at step L.

Figure 20A:
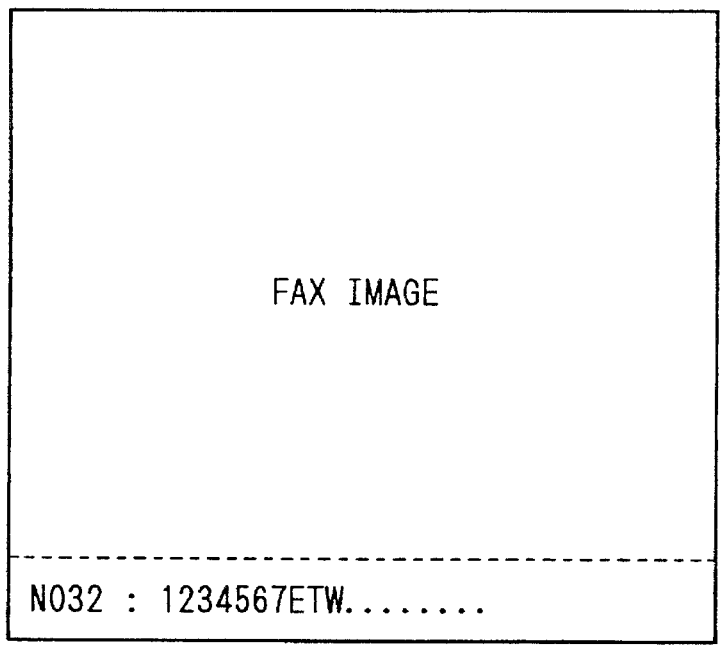
FIG. 20(A) is a diagram showing a facsimile image received from the host, along with a retrieval number and a corresponding dialing procedure.
Figure 20B:
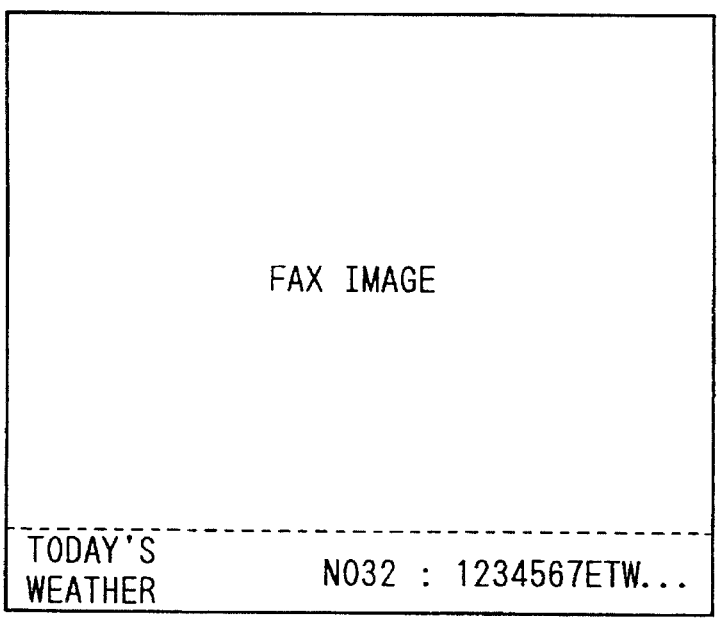
FIG. 20(B) is a diagram showing a facsimile image received from the host, along with a retrieval name, a retrieval number and a corresponding dialing procedure.

If "YES" is selected in the displayed image of FIG. 19(B), a retrieval number (abbreviated number) and a retrieval name are recorded along with the corresponding dialing procedure newly produced, as shown in FIG. 19(C). Further, the retrieval number and the corresponding dialing procedure are printed on the reception recording paper along with the received image from the host 3, as shown in FIG. 20(A). It may be arranged to further print the retrieval name as shown in FIG. 20(B).

As appreciated from the foregoing description, in the third preferred embodiment, the dialing procedure is easily and precisely produced by the user. Further, since the retrieval number and the corresponding dialing procedure are printed along with the received image from the host, when the received images are filed, a desired retrieval number can be easily found out by checking the file. This is particularly useful when the number of the items on the service selection menu in FIG. 18(B) is increased since it is difficult to find out a necessary retrieval number on the display unit 7.

Now, a fourth preferred embodiment of the present invention will be described hereinbelow.

Figure 21:
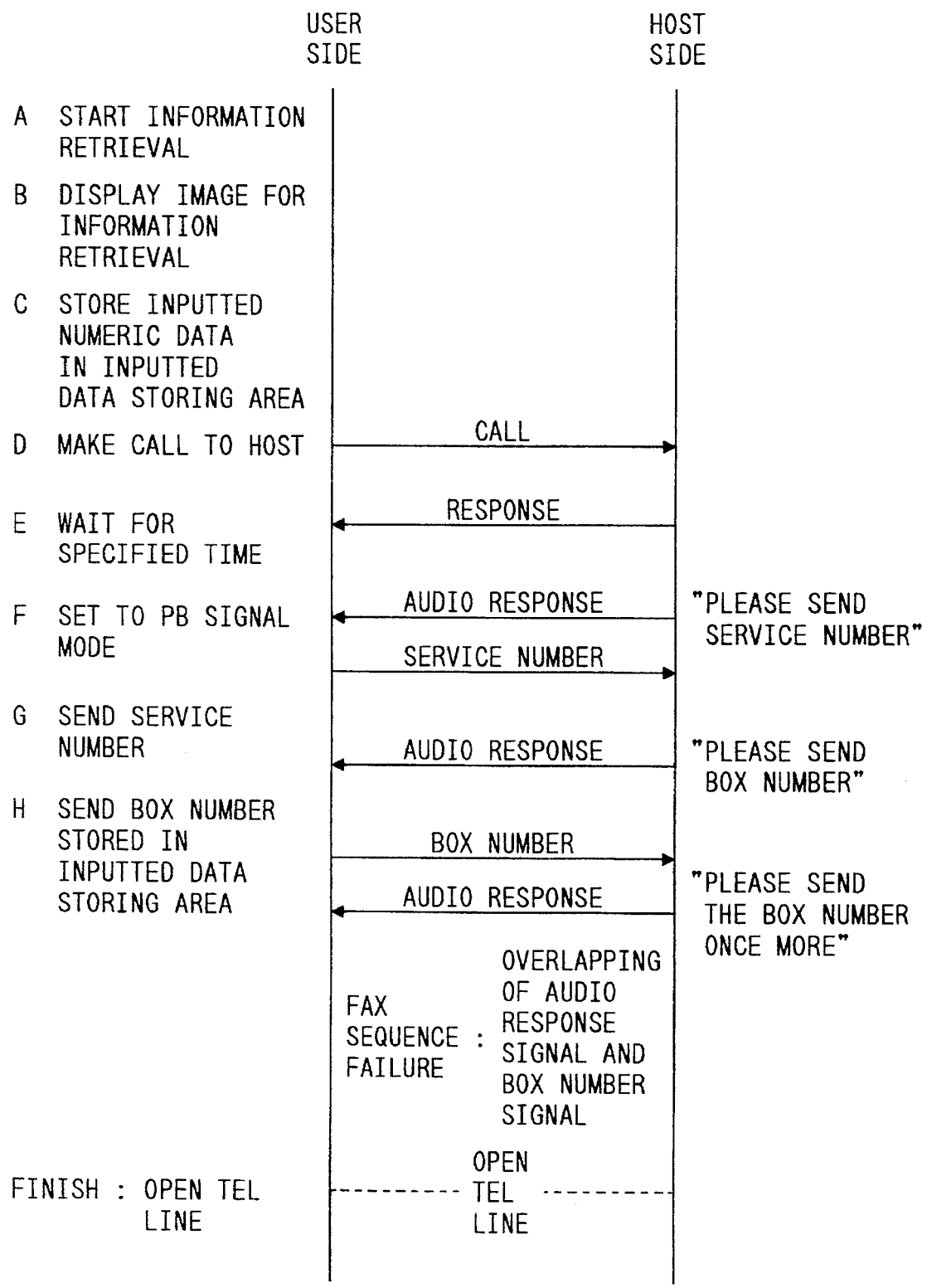
FIG. 21 is a time-domain diagram showing a communication sequence between the user's facsimile apparatus and the host according to a fourth preferred embodiment of the present invention.

FIG. 21 is a time-domain diagram showing a communication sequence between the user's facsimile apparatus and the host 3 according to this preferred embodiment. FIG. 21 shows a case, wherein the box number is sent to the host 3 while the host 3 sends the audio response "Please send a box number." As a result, the box number can not be received by the host 3 as effective data. As described before with reference to FIG. 16, this may be caused when the host 3 and the user's facsimile apparatus perform the transmitting operations independently of each other according to their own predetermined time intervals, and these predetermined time intervals are not precisely set, or when the host has changed such time intervals.

In FIG. 21, the operation sequence from step A to step H is the same as that in FIG. 16. However, at step H in FIG. 21, since the box number is sent to the host 3 before the termination of the audio response "Please send a box number", the host can not receive the transmitted data as effective data. Although the host is programmed to send an audio message "Please send the box number once more", the user's facsimile apparatus is not programmed to answer this audio message so that the facsimile communication is to be stopped.

However, since tile user's facsimile apparatus has transmitted all the data to be transmitted and is set ready for shifting to the facsimile receiving mode, the communication can be only stopped when the user's facsimile apparatus opens the telephone line due to the fact that a given time has elapsed with no CNG signal received from the host. Further, in general, the user can not notice the generation of the error until the telephone line is opened. Accordingly, there is a considerable time lag from the generation of timing discrepancy between the host and the user's facsimile apparatus to the stoppage of the communication due to the opening of the line so that telephone charges are increased.

The fourth preferred embodiment is aimed to eliminate the foregoing disadvantage. Specifically, in this preferred embodiment, such an error is detected by the modem 4 working as detection means, and the display unit 7 displays the currently executed dialing procedure with an indication of a position where the error is generated. FIG. 22(A) shows one example of an image to be displayed according to this preferred embodiment. In FIG. 22(A), the displayed image shows that the error occurred when the box number "87654321" was transmitted to the host. In this case, it can be assumed that the transmission interval between the service number and the box number is so short as to cause the error. Accordingly, the user may correct this transmission interval from "W10" to "W15" as shown in FIG. 22(B) and then try connection to the host based on the correct dialing procedure. It may be arranged to perform such correction in the displayed image of FIG. 22(A) and then press "YES" for re-connection to the host.

As appreciated from the foregoing description, in the fourth preferred embodiment, the generation of the error and its position on the dialing procedure are displayed on the display unit 7. Accordingly, the generation of the error can be immediately recognized by the user. Further, the user can recognize the position of the generation of the error on the dialing procedure, the correction thereof can be performed easily and effectively. Still further, if the user watches the displayed image of FIG. 22(A) monitoring the audio responses of the host, the nature of the error can be understood more precisely. On the other hand, it may be arranged that the time counting means monitors time intervals between the audio responses from the host to automatically correct "W10" to "W15" and to automatically make a recall to the host based on the corrected time interval.

Now, a fifth preferred embodiment of the present invention will be described hereinbelow.

Figure 23:
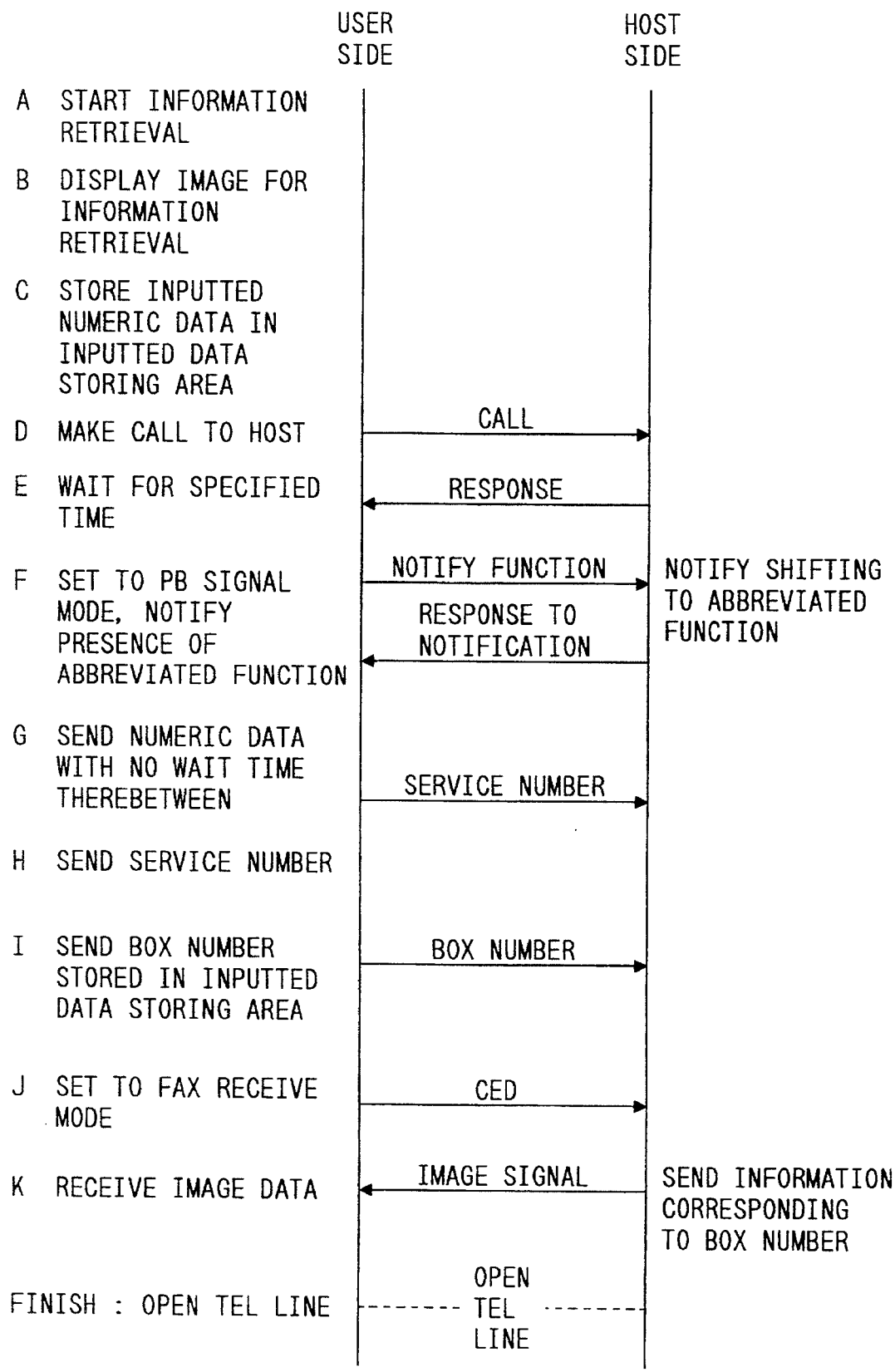
FIG. 23 is a time-domain diagram showing a communication sequence between the user's facsimile apparatus and the host according to a fifth preferred embodiment of the present invention.
Figure 24:
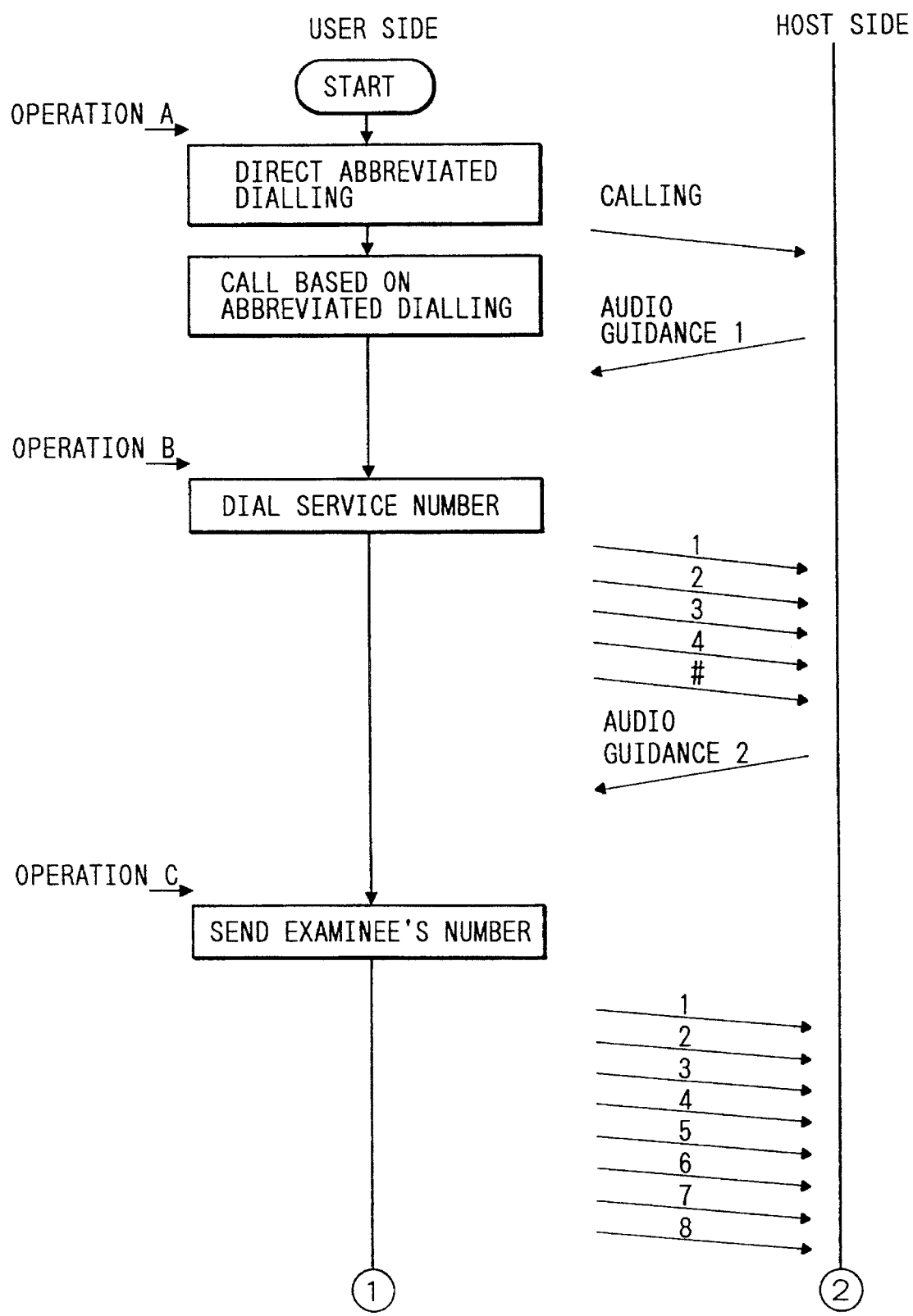
FIGS. 24 and 25 are time-domain diagrams for explaining operations of a user's facsimile apparatus and a host with regard to a communication service of "requesting trial examination result" according to the prior art.
Figure 25:
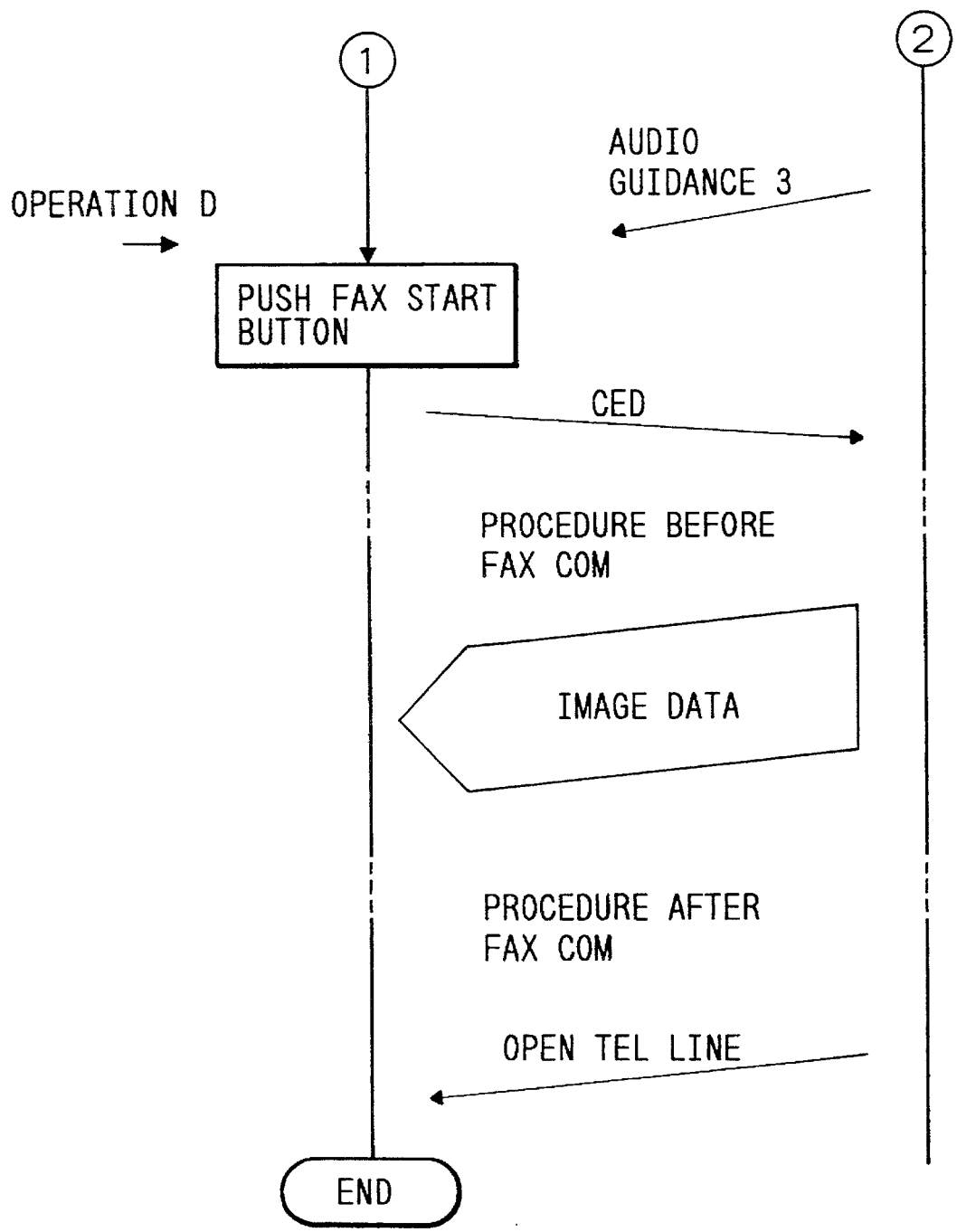

In the fifth preferred embodiment, when the host and the user's facsimile apparatus both have the abbreviated transmission functions, only the data are continuously transmitted from the user's facsimile apparatus to the host with no audio responses from the host. FIG. 23 shows a communication sequence according to this preferred embodiment. It is assumed that the dialing procedure to be executed is "1234567ETW32121W1087654321W5X". In FIG. 23, the sequence from step A to step E is the same as that in FIG. 16. However, at step F, the user's facsimile apparatus notifies the host that the former has the abbreviated function which can transmit the data continuously with no waiting time therebetween. In response to this notification from the user's facsimile apparatus, the host notifies the user's facsimile apparatus that the host is shifted to the abbreviated function. In response to this notification from the host, the user's facsimile apparatus transmits the data in a continuous manner omitting the waiting time therebetween at step G. Specifically, the user's facsimile apparatus transmits the service number skipping "W3" at step H, then the box number skipping W10" at step I and then the CED signal skipping "W5" so as to shift to the facsimile receiving mode at step J. In response to the CED signal, the host transmits the required information as an image signal, which is then received by the user's facsimile apparatus at step K. Thereafter, the telephone line is opened when the receipt of the image signal is finished.

According to the fifth preferred embodiment, a time period from the closing of the telephone line to the start of the facsimile communication is largely shortened. This increases the user's working efficiency.

It is to be understood that this invention is not to be limited to the preferred embodiments and modifications described above, and that various changes and modifications may be made without departing from the spirit and scope of the invention as defined in the appended claims.

What is claimed is:

1. A facsimile communication system comprising:

operation means including a plurality of keys;

storing means for prestoring a first telephone number of a given station and a command string including a plurality of first commands each identified by at least one character and each otherwise inputted by an operator using said operation means, said first commands arranged according to a procedure for receiving a service from said given station, said storing means storing said first telephone number and said command string in a pair as a character string and in a first storing area which corresponds to at least one of said keys; and control means, when said at least one of the keys is pressed, for analyzing the character string stored in the first storing area corresponding to said at least one of the keys and instructing an input of individual information upon detection, in said character string, of a second command requiring the input of said individual information, wherein said control means, after confirming the input of said individual information, sends out said first telephone number to make a call to said given station and communicates with said given station based on said command string including transmission of said individual information.

2. The facsimile communication system according to claim 1, wherein said storing means further includes a second storing area which only stores a second telephone number of another station, and wherein said control means, when said at least one of the keys is pressed, analyzes the character string stored in the first storing area corresponding to said at least one of the keys, and, upon detection in said character string of a third command requiring said given station to provide the service to said another station and representing the second storing area storing the second telephone number to said another station, sends out said second telephone number to said given station while communicating with said given station based on said command string.

3. The facsimile communication system according to claim 1, wherein said control means, when said at least one of the keys is pressed, analyzes the character string stored in the first storing area corresponding to said at least one of the keys, and, upon detection in said character string of an identification mark before said first commands, transmits said first commands as a PB signal.

4. The facsimile communication system according to claim 1, wherein the first telephone number and the first commands are first inputted by the operator using said operation means, wherein said control means, when sending out the first telephone number and the first commands inputted by the operator through said operation means to said given station, produces the character string based on a sending process of said first telephone number and said first commands and automatically stores the produced character string in said storing means and wherein said control means subsequently sends out the first telephone number and communicates with said given station based on said automatically stored character string.

5. The facsimile communication system according to claim 4, wherein said control means, when image information indicative of said service is received from said given station, outputs said image information along with said character string.

6. The facsimile communication system according to claim 4, wherein said control means informs an occurrence of an error to the operator upon detection of a timing discrepancy in signal transmission relative to a response from said given station during transmission performed in accordance with the character string stored in said storing means.

7. The facsimile communication system according to claim 4, wherein display means is provided for displaying the character string, wherein said control means, while transmitting in accordance with the character string, controls said display means to display said character string so as to show a transmission progress on said displayed character string, and wherein said control means controls said display means to indicate a position of occurrence of an error in said character string upon detection of a timing discrepancy in signal transmission relative to a response from said given station.

8. The facsimile communication system according to claim 4, wherein said control means, upon detection of a timing discrepancy in signal transmission relative to a response from said given station while transmitting in accordance with the character string stored in said storing means, automatically corrects a command indicative of a transmission interval between the first telephone number and the first commands in said stored character string to a command indicative of a proper transmission interval therebetween.

9. The facsimile communication system according to claim 1, wherein said control means, when image information indicative of said service is received from said given station, outputs said image information along with said character string.

10. The facsimile communication system according to claim 1, wherein said control means informs an occurrence of an error to the operator upon detection of a timing discrepancy in signal transmission relative to a response from said given station during transmission performed in accordance with the character string stored in said storing means.

11. The facsimile communication system according to claim 1, wherein display means is provided for displaying the character string, wherein said control means, while transmitting in accordance with the character string, controls said display means to display said character string so as to show a transmission progress on said displayed character string, and wherein said control means controls said display means to indicate a position of occurrence of an error in said character string upon detection of a timing discrepancy in signal transmission relative to a response from said given station.

12. The facsimile communication system according to claim 1, wherein said control means, upon detection of a timing discrepancy in signal transmission relative to a response from said given station while transmitting in accordance with the character string stored in said storing means, automatically corrects a command indicative of a transmission interval between the first telephone number and the first command in said stored character string to a command indicative of a proper transmission interval therebetween.

13. A facsimile communication system comprising:

operation means including a plurality of keys;

storing means for storing a first telephone number of a given station and a first command for designating one of services offered from said given station and for executing a procedure for receiving the designated service, said storing means storing said first telephone number and said first command in a pair of a character string and in a first storing area which corresponds to at least one of said keys; and control means, when said at least one of the keys is pressed, for reading out the first telephone number from the first storing area corresponding to said at least one of the keys so as to make a call to said given station and for reading out the first command from said first storing area so as to transmit it to said given station in a manner to match a communication procedure of said given station;

wherein said control means, when sending out the first telephone number and the first command inputted through said operation means to said given station, produces the character string based on a sending process of said first telephone number and said first command and automatically stores the produced character string in said storing means; and wherein said control means, when sending out the first telephone number and the first command inputted through said operation means to said given station, counts a time interval between transmission of said first telephone number and transmission of said first command in said sending process and produces said character string by adding, between said first telephone number and said first command, a command indicative of said counted time interval.

14. The facsimile communication system according to claim 13, wherein said control means transmits a notification to said given station that an abbreviated transmission function for abbreviating a transmission procedure is available, and wherein said control means, upon detection of a response to said notification from said given station, transmits said first command by omitting said time interval set between the first telephone number and the first command in the character string stored in said storing means.

15. A facsimile communication system comprising:

operation means including a plurality of keys;

storing means for storing a telephone number of a given station and a first command for designating one of services offered from said given station and for executing a procedure for receiving the designated service, wherein said storing means stores said telephone number and said first command in a pair as a character string; and control means, when sending out the telephone number and the first command inputted through said operation means to said given station, for counting a time interval between transmission of said telephone number and transmission of said first command, producing said character string by adding, between said telephone number and said first command, a second command indicative of said counted time interval, and automatically storing said produced character string in said storing means.

16. A facsimile communication system comprising:

operation means including a plurality of keys;

storing means for storing a telephone number of a given station and a first command for designating one of services offered from said given station and for executing a procedure for receiving the designated service, wherein said storing means stores said telephone number and said first command in a pair as a character string including a second command indicative of a time interval between said telephone number and said first command; and control means, when sending out the telephone number and the first command inputted through said operation means to said given station, for transmitting a notification to said given station that an abbreviated transmission function for abbreviating a transmission procedure is available, wherein said control means, upon detection of a response to said notification from said given station, transmits said first command by omitting said time interval set between the telephone number and the first command in the character string stored in said storing means.

* * * * *